(12) United States Patent
Kitoh et al.

(10) Patent No.: US 7,724,326 B2
(45) Date of Patent: May 25, 2010

(54) LIQUID CRYSTAL DISPLAY DEVICE COMPRISING A SHADING CONDUCTIVE LAYER FORMED AT LEAST NEAR AN OPENING OR CUT OF AN ELECTRODE

(75) Inventors: Tsunanori Kitoh, Kitakatsuragi-gun (JP); Takeshi Kawahara, Tenri (JP); Kazuhiko Tamai, Nabari (JP); Noriaki Onishi, Nara (JP); Yasuhiro Kume, Kawachinagano (JP); Takaaki Okamoto, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 1304 days.

(21) Appl. No.: 11/061,601

(22) Filed: Feb. 22, 2005

(65) Prior Publication Data

US 2005/0185120 A1    Aug. 25, 2005

(30) Foreign Application Priority Data

Feb. 19, 2004 (JP) .............................. 2004-043537
Feb. 4, 2005 (JP) .............................. 2005-028649

(51) Int. Cl.
*G02F 1/1343* (2006.01)

(52) U.S. Cl. .................. 349/111; 349/44; 349/114; 349/129; 349/130; 349/143

(58) Field of Classification Search ............... None
See application file for complete search history.

(56) References Cited

U.S. PATENT DOCUMENTS

| | | | |
|---|---|---|---|
| 5,408,345 A | 4/1995 | Mitsui et al. | |
| 5,666,179 A | 9/1997 | Koma | |
| 5,828,434 A * | 10/1998 | Koden et al. | 349/148 |
| 5,995,176 A | 11/1999 | Sibahara | |
| 6,195,140 B1 | 2/2001 | Kubo et al. | |
| 6,384,889 B1 | 5/2002 | Miyachi et al. | |

(Continued)

FOREIGN PATENT DOCUMENTS

EP     1 113 312 A2     7/2001

(Continued)

OTHER PUBLICATIONS

U.S. Appl. No. 10/980,867, filed Nov. 4, 2004, entitled "Liquid Crystal Display Device and Fabrication Method Therefor".

(Continued)

*Primary Examiner*—Andrew Schechter
*Assistant Examiner*—Paisley L Arendt
(74) *Attorney, Agent, or Firm*—Nixon & Vanderhye P.C.

(57) ABSTRACT

The liquid crystal display device of the invention has a plurality of pixels, each including a first electrode 111, a second electrode 131 and a vertically aligned liquid crystal layer 120 interposed between the first and second electrodes. The first electrode has at least one opening 114 or cut 113 formed at a predetermined position in the pixel. At least one shading conductive layer 116 electrically connected to the first electrode is formed at least near the at least one opening or cut. In each of the plurality of pixels, a plurality of regions in which the directions of tilt of liquid crystal molecules are different from one another are formed when at least a predetermined voltage is applied across the liquid crystal layer.

19 Claims, 13 Drawing Sheets

U.S. PATENT DOCUMENTS

| | | | |
|---|---|---|---|
| 6,407,791 B1 * | 6/2002 | Suzuki et al. | 349/129 |
| 6,424,396 B1 | 7/2002 | Kim et al. | |
| 6,452,654 B2 | 9/2002 | Kubo et al. | |
| 6,466,296 B1 | 10/2002 | Yamada et al. | |
| 6,573,965 B1 * | 6/2003 | Liu et al. | 349/129 |
| 6,753,939 B2 | 6/2004 | Jisaki et al. | |
| 6,774,967 B2 * | 8/2004 | Kim et al. | 349/129 |
| 6,788,375 B2 | 9/2004 | Ogishima et al. | |
| 7,245,343 B2 * | 7/2007 | Suzuki et al. | 349/153 |
| 2001/0024257 A1 | 9/2001 | Kubo et al. | |
| 2005/0068482 A1 | 3/2005 | Kume et al. | |

FOREIGN PATENT DOCUMENTS

| | | |
|---|---|---|
| JP | 7-253587 A | 10/1995 |
| JP | 9-90426 | 4/1997 |
| JP | 2001-125144 | 5/2001 |
| JP | 2002-55374 A | 2/2002 |
| JP | 2003-315803 | 11/2003 |
| KR | 2003-0058012 A | 7/2003 |

OTHER PUBLICATIONS

U.S. Appl. No. 11/005,322, filed Dec. 7, 2004, entitled "Liquid Crystal Display Device and Fabrication Method Therefor".

U.S. Appl. No. 11/019,635, filed Dec. 23, 2004, entitled "Liquid Crystal Display Device".

* cited by examiner

Transparent Dielectric Layer 334
Liquid Crystal Molecules LC
Equipotential Lines EQ 311a  Cut 313a  311b Transparent Dielectric Layer
Liquid Crystal Molecules LC
Equipotential Lines EQ Pixel Electrode

LIQUID CRYSTAL DISPLAY DEVICE COMPRISING A SHADING CONDUCTIVE LAYER FORMED AT LEAST NEAR AN OPENING OR CUT OF AN ELECTRODE

BACKGROUND OF THE INVENTION

1. Field of the Invention

The present invention relates to a liquid crystal display device and more particularly relates to a liquid crystal display device suitably used for portable information terminals (for example, PDAs), mobile phones, car-mounted liquid crystal displays, digital cameras, PCs, amusement equipment, TVs and the like.

2. Description of the Related Art

The information infrastructure is advancing day to day, and equipment such as mobile phones, PDAs, digital cameras, video cameras and car navigators has penetrated deeply into people's lives. Liquid crystal display (LCD) devices have been adopted in most of such equipment. With increase of the information amount handled with the main bodies of the equipment, LCD devices are requested to display a larger amount of information, and are demanded by the market for higher contrast, a wider viewing angle, higher brightness, multiple colors and higher definition.

A vertical alignment mode using a vertically aligned liquid crystal layer has increasingly received attention as a display mode enabling high contrast and a wide viewing angle. The vertically aligned liquid crystal layer is generally obtained using a vertical alignment film and a liquid crystal material having negative dielectric anisotropy.

For example, Japanese Laid-Open Patent Publication No. 6-301036 (Literature 1) discloses an LCD device in which an inclined electric field is generated around an opening formed in a counter electrode that faces a pixel electrode via a liquid crystal layer, so that liquid crystal molecules surrounding liquid crystal molecules existing in the opening, which are in the vertically aligned state, are aligned in inclined directions around the opening as the center, to thereby improve the visual angle characteristics.

However, in the device described in Literature 1, it is difficult to generate an inclined electric field over the entire region of each pixel. Therefore, each pixel has a region in which liquid crystal molecules delay in response to a voltage, and this causes a problem of occurrence of an afterimage phenomenon.

To solve the above problem, Japanese Laid-Open Patent Publication No. 2000-47217 (Literature 2) discloses an LCD device in which a plurality of openings regularly arranged are provided in a pixel electrode or a counter electrode, to form a plurality of liquid crystal domains each having axisymmetric alignment in each pixel.

Japanese Laid-Open Patent Publication No. 2003-167253 (Literature 3) discloses a technology in which a plurality of projections are provided regularly in each pixel to stabilize the aligned state of liquid crystal domains having radially inclined alignment formed around the projections. This literature also discloses using an inclined electric field generated at openings formed in an electrode, together with the alignment regulating force of the projections, to regulate the alignment of liquid crystal molecules, and thus improve the display characteristics.

Japanese Laid-Open Patent Publication No. 11-242225 (Literature 4) discloses a vertically aligned LCD device (MVA LCD device) having a plurality of slits (openings or cuts) extending in parallel with one another and projections or depressions formed in an electrode in each pixel.

In recent years, a type of LCD device providing high-quality display both outdoors and indoors has been proposed (see Japanese Patent Gazette No. 2955277 (Literature 5) and U.S. Pat. No. 6,195,140 (Literature 6), for example). In this type of LCD device, called a transflective LCD device, each pixel has a reflection region in which display is done in the reflection mode and a transmission region in which display is done in the transmission mode.

The currently available transflective LCD devices adopt an ECB mode, a TN mode and the like. Literature 3 described above also discloses adoption of the vertical alignment mode for, not only a transmissive LCD device, but also a transflective LCD device. Japanese Laid-Open Patent Publication No. 2002-350853 (Literature 7) discloses a technology in which in a transflective LCD device having a vertically aligned liquid crystal layer, the alignment (multi-axis alignment) of liquid crystal molecules is controlled with depressions formed on an insulating layer. The insulating layer is provided to make the thickness of the liquid crystal layer in a transmission region twice as large as that in a reflection region. According to this literature, the depressions are in the shape of a regular octagon, for example, and projections or slits (electrode openings) are formed at positions opposed to the depressions via the liquid crystal layer (see FIGS. 4 and 16 of Literature 7, for example).

In the devices having openings and/or cuts in electrodes in pixels as described in Literature 1 to 4, problems such as overetching and peeling off of a conductive film constituting the electrodes may occur in formation of the openings and cuts by etching, and as a result, the electrodes may be cut off and regions having no voltage supply may be formed. Formation of regions shut off from supply of a predetermined voltage in pixels will be recognized as display defects (black points in normally black mode display).

Also, when openings or cuts (electrical alignment regulating structure) and projections and depressions (physical alignment regulating structure) are provided as alignment regulating structures as described in Literature 1 to 7, liquid crystal molecules near such alignment regulating structures are inclined more greatly (closer to the horizon) than liquid crystal molecules in the other regions. Regions having such alignment regulating structures are therefore observed as brighter than the other regions in normally black display. In particular, the physical alignment regulating structures, which use the effect of the shapes of the projections and depressions and the like, exert their alignment regulating forces even during non-voltage application. Light leakage therefore occurs even in the black display state and this causes decrease in contrast ratio.

In view of the above, a major object of the present invention is providing a liquid crystal display device in which occurrence of display defects caused by cutting off of electrodes in pixels, which may otherwise occur when openings or cuts are formed in the electrodes, is prevented. Another object of the present invention is providing a liquid crystal display device in which reduction in contrast ratio due to light leakage, which may otherwise occur with alignment regulating structures formed in pixels, is suppressed.

Yet another object of the present invention is providing a transflective liquid crystal display device having a transparent dielectric layer in each reflection region, which has improved display quality.

SUMMARY OF THE INVENTION

In order to overcome the problems described above, the liquid crystal display device according to the first aspect of the present invention includes a first substrate, a second substrate opposed to the first substrate, and a vertically aligned liquid crystal layer interposed between the first substrate and the second substrate, wherein the liquid crystal display device has a plurality of pixels, each pixel including a first electrode formed on the first substrate, a second electrode formed on the second substrate, and the liquid crystal layer interposed between the first electrode and the second electrode, the first electrode has at least one opening or cut formed at a predetermined position in the pixel, at least one shading conductive layer electrically connected to the first electrode is formed at least near the at least one opening or cut, and in each of the plurality of pixels, a plurality of regions in which the directions of tilt of liquid crystal molecules are different from one another are formed when at least a predetermined voltage is applied across the liquid crystal layer.

In one embodiment, in each of the plurality of pixels, at least one liquid crystal domain exhibiting axisymmetric alignment is formed when at least a predetermined voltage is applied across the liquid crystal layer.

In another embodiment, the at least one shading conductive layer includes a shading conductive layer covering at least part of the at least one opening or cut.

In yet another embodiment, the at least one opening or cut includes two cuts opposed each other, and the at least one shading conductive layer includes a first shading conductive layer covering the two opposing sides of the two cuts. The at least one shading conductive layer is not necessarily formed to cover a region including the two opposing sides of the two cuts, but may be formed between the two opposing sides.

In one embodiment, the at least one opening or cut includes at least two openings, and the at least one shading conductive layer includes at least two shading conductive layers covering the at least two openings.

In another embodiment, the liquid crystal layer has at least two liquid crystal domains each exhibiting axisymmetric alignment when at least a predetermined voltage is applied, and the center axes of the axisymmetric alignment of the at least two liquid crystal domains are formed in or near the at least two openings.

In another embodiment, the shading conductive layer is formed of a metal film.

In yet another embodiment, the metal film includes at least one kind of metal element selected from the group consisting of Al, Ag, Ti, Ta, Mo and W.

In yet another embodiment, the device further includes a shading region in the gaps between the plurality of pixels, and a wall structure regularly arranged on the surface of the first substrate facing the liquid crystal layer in the shading region.

In yet another embodiment, the second electrode has at least one further opening formed at a predetermined position in the pixel, and the center axis of axisymmetric alignment of the at least one liquid crystal domain formed when at least a predetermined voltage is applied across the liquid crystal layer is formed in or near the at least one further opening.

In yet another embodiment, at least one further shading conductive layer electrically connected to the second electrode is formed to cover the at least one further opening.

In yet another embodiment, the first electrode includes a transparent electrode defining a transmission region and a reflective electrode defining a reflection region, and the thickness dt of the liquid crystal layer in the transmission region and the thickness dr of the liquid crystal layer in the reflection region satisfy the relationship 0.3 dt<dr<0.7 dt.

In yet another embodiment, the first electrode includes a transparent electrode defining a transmission region and a reflective electrode defining a reflection region, the at least one liquid crystal domain includes a liquid crystal domain formed in the transmission region, the at least one opening or cut includes an opening corresponding to the center axis of the liquid crystal domain formed in the transmission region and a plurality of cuts formed point-symmetrically with respect to the opening.

In yet another embodiment, the reflective electrode and the at least one shading conductive layer are formed from a same metal film.

In yet another embodiment, a transparent dielectric layer is formed selectively on the second substrate in the reflection region.

In yet another embodiment, the device further includes: a pair of polarizing plates placed to face each other via the first substrate and the second substrate; and at least one biaxial optical anisotropic medium layer placed between the first substrate and one of the pair of polarizing plates and/or between the second substrate and the other polarizing plate.

In yet another embodiment, the device further includes: a pair of polarizing plates placed to face each other via the first substrate and the second substrate; and at least one uniaxial optical anisotropic medium layer placed between the first substrate and one of the pair of polarizing plates and/or between the second substrate and the other polarizing plate.

The liquid crystal display device according to the second aspect of the present invention includes a first substrate, a second substrate opposed to the first substrate, and a vertically aligned liquid crystal layer interposed between the first substrate and the second substrate, wherein the liquid crystal display device has a plurality of pixels, each pixel including a first electrode formed on the first substrate, a second electrode formed on the second substrate, and the liquid crystal layer interposed between the first electrode and the second electrode, the first electrode has a transparent electrode defining a transmission region, a reflective electrode defining a reflection region, and a cut formed between the transparent electrode and the reflective electrode, the second substrate further has a transparent dielectric layer in the reflection region, the thickness dt of the liquid crystal layer in the transmission region and the thickness dr of the liquid crystal layer in the reflection region satisfy the relationship 0.3 dt<dr<0.7 dt, the transparent dielectric layer has an end face coinciding the center of the width of the cut or located on the side of the reflective electrode with respect to the center, and the liquid crystal layer has at least one liquid crystal domain exhibiting axisymmetric alignment in each of the transmission region and the reflection region when at least a predetermined voltage is applied.

In one embodiment, the potential at the center of the cut is lower than a threshold voltage of the liquid crystal layer when a white voltage is applied across the liquid crystal layer.

The liquid crystal display device according to the second aspect of the invention can be combined with the liquid crystal display device according to the first aspect described above.

In the liquid crystal display device according to the first aspect of the invention, at least one opening or cut is provided in an electrode in each pixel to form a plurality of regions in which the directions of tilt of liquid crystal molecules are different from one another when at least a predetermined voltage is applied across the liquid crystal layer. At least part of the opening or cut is covered with a shading conductive layer (for example, a metal layer) that is electrically connected to the electrode. Hence, even if overetching, peeling off of a conductive film constituting the electrode and the like occurs during formation of the opening or cut by etching, electric connection is ensured with the shading conductive layer, and thus formation of a region shut off from supply of a predetermined voltage in the pixel is prevented. As a result, occurrence of a display defect is suppressed/prevented. Also, by covering the opening formed to fix the center axis of axisymmetric alignment with a shading conductive layer, light leakage near the opening can be minimized/prevented.

In the liquid crystal display device according to the second aspect of the invention, which is a transflective liquid crystal layer having a transparent dielectric layer in the reflection region, the transparent dielectric layer is placed so that its end face coincides with the center of the width of a cut or is located on the side of the reflective electrode with respect to the center. Hence, the axisymmetric alignment formed in the transmission region and the reflection region is stabilized, and this improves the display quality. Naturally, a liquid crystal display device having both features of the constructions of the first and second aspects has the effects of both devices.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIGS. 1A and 1B diagrammatically show one pixel of a transmissive LCD device 100 of an embodiment according to the first aspect of the present invention, in which FIG. 1A is a plan view and FIG. 1B is a cross-sectional view taken along line 1B-1B' in FIG. 1A.

FIGS. 2A and 2B diagrammatically show one pixel of a transflective LCD device 200 of an embodiment according to the first aspect of the present invention, in which FIG. 2A is a plan view and FIG. 2B is a cross-sectional view taken along line 2B-2B' in FIG. 2A.

FIGS. 10A and 10B diagrammatically show one pixel of a transflective LCD device 300 of an embodiment according to the second aspect of the present invention, in which FIG. 10A is a plan view and FIG. 10B is a cross-sectional view taken along line 10B-10B' in FIG. 10A.

DETAILED DESCRIPTION OF PREFERRED EMBODIMENTS

Hereinafter, preferred embodiments of the present invention will be described with reference to the accompanying drawings.

(Transmissive LCD Device)

Figure 1A:
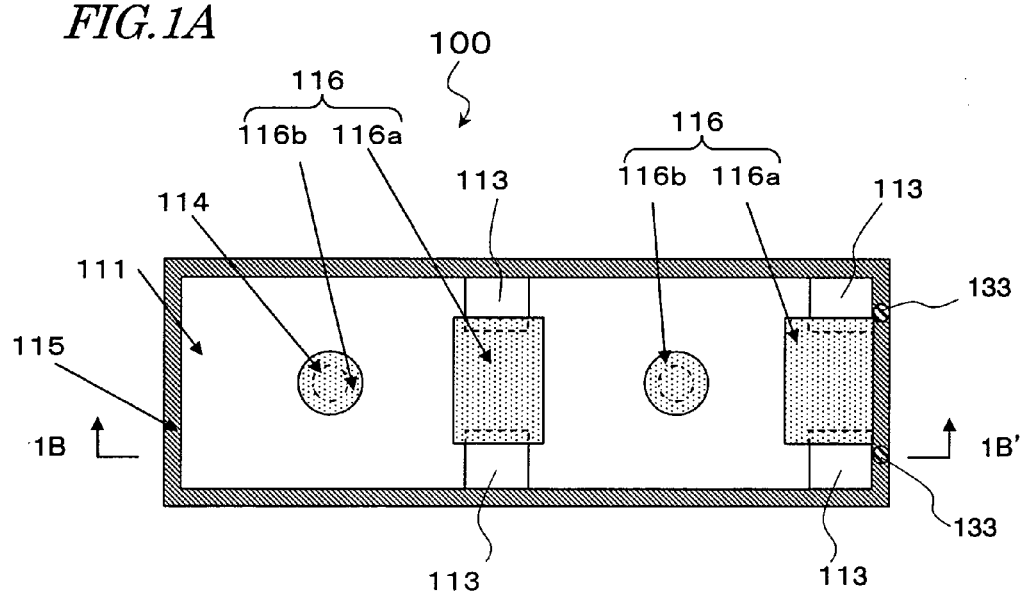
Figure 1B:
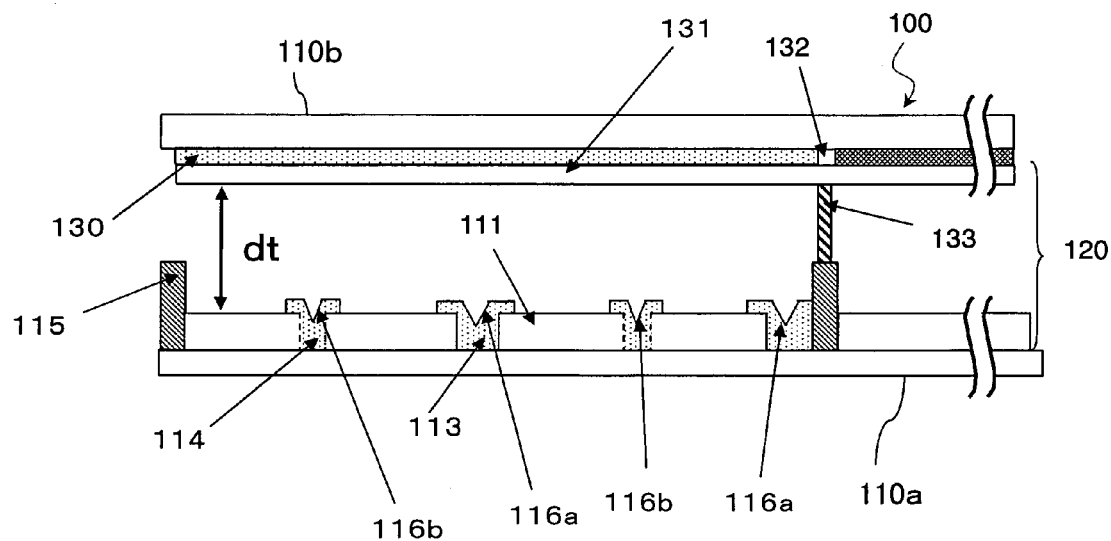

A transmissive LCD device 100 of an embodiment according to the first aspect of the present invention will be described with reference to FIGS. 1A and 1B. FIGS. 1A and 1B diagrammatically show one pixel of the transmissive LCD device 100, in which FIG. 1A is a plan view and FIG. 1B is a cross-sectional view taken along line 1B-1B' in FIG. 1A.

Hereinafter, described will be the case that one pixel is divided into two parts (N=2). The number of parts into which one pixel is divided (=N) can also be three or more depending on the pixel pitch. In any case, the number of openings (=n) each to be positioned roughly in the center of a divided region on a second substrate, in this case, is preferably the same as the number of divided parts (=N). The effective aperture ratio tends to decrease with increase of the number of divided parts (=N). Therefore, for an application to a high-definition display panel, the number of divided parts (=N) is preferably made small. The present invention is also applicable to the case involving no pixel division (this may be expressed as N=1). Each of the divided regions may be called a "sub-pixel". One liquid crystal domain is typically formed in each sub-pixel.

The LCD device 100 includes a transparent substrate (for example, a glass substrate) 110a, a transparent substrate 110b placed to face the transparent substrate 110a, and a vertically aligned liquid crystal layer 120 interposed between the transparent substrates 110a and 110b. Vertical alignment films (not shown) are formed on the surfaces of the substrates 110a and 110b facing the liquid crystal layer 120. During non-voltage application, therefore, liquid crystal molecules in the liquid crystal layer 120 are aligned roughly vertical to the surfaces of the vertical alignment films. The liquid crystal layer 120 includes a nematic liquid crystal material having negative dielectric anisotropy and also includes a chiral agent as required.

The LCD device 100 further includes pixel electrodes 111 formed on the transparent substrate 110a and a counter electrode 131 formed on the transparent substrate 110b. Each pixel electrode 111, the counter electrode 131 and the liquid crystal layer 120 interposed between these electrodes define a pixel. In the illustrated example, both the pixel electrodes 111 and the counter electrode 131 are formed of a transparent conductive film (for example, an ITO film). Typically, color filters 130 (the entire of the plurality of color filters may also be called a color filter layer 130) provided for the respective pixels, as well as a black matrix (shading layer) 132 formed in the gaps between the adjacent color filters 130, are formed on the surface of the transparent substrate 110b facing the liquid crystal layer 120, and the counter electrode 131 is formed on the color filters 130 and the black matrix 132. Alternatively, the color filters 130 and the black matrix 132 may be formed on the counter electrode 131 (on the surface thereof facing the liquid crystal layer 120).

In the LCD device 100 shown in FIGS. 1A and 1B, in which the number of divided parts (=N) is 2, a wall structure 115 to be described later extends on the transparent substrate 110a in a shading region around the pixel electrodes 111. Each pixel electrode 111 has openings 114 of the number corresponding to the number of divided parts (n=2 in the illustrated example) at predetermined positions in the pixel, and also has four cuts 113 at predetermined positions. The LCD device 100 also includes a shading conductive layer 116 formed at predetermined positions in each pixel. The illustrated shading conductive layer 116 has shading conductive layers 116b formed to cover the openings 114 in the pixel electrode 111 and shading conductive layers 116a formed to cover part of the cuts 113. Each of the shading conductive layers 116a covering part of the cuts 113 is placed to cover a region including two opposing sides of the two cuts 113 opposed each other.

When a predetermined voltage is applied across the liquid crystal layer 120, two (number equal to the number of divided parts N) liquid crystal domains each having axisymmetric alignment are formed, with the center axes of the axisymmetric alignment thereof being in or near the openings 114 (that is, in or near depressions formed on the surfaces of the shading conductive layers 116b in correspondence with the openings 114). As will be described later in detail, the openings 114 (the depressions of the shading conductive layers 116b) act to fix the positions of the center axes of the axisymmetrically aligned domains.

The cuts 113, provided in the pixel electrode 111 near the boundaries of the axisymmetrically aligned domains, define the directions in which liquid crystal molecules fall with an electric field, and thus act to form the axisymmetrically aligned domains. An inclined electric field is generated around the cuts 113 with a voltage applied between the pixel electrode 111 and the counter electrode 131. With this inclined electric field, the directions of tilt of liquid crystal molecules are defined. The wall structure 115 also acts to define the directions of tilt of liquid crystal molecules during voltage application (during generation of an electric field) with its slope face effect. The alignment regulating force of the slope faces of the wall structure 115 acts even during non-voltage application, causing liquid crystal molecules to tilt. During voltage application, the inclined electric field generated with the cuts 113 and the action of an electric field distorted with the wall structure 115 define the directions of tilt of liquid crystal molecules, resulting in formation of the axisymmetric alignment as described above. In the illustrated example, a total of four cuts 113 are given point-symmetrically with respect to the opening 114 (in this case, the right opening as viewed from FIG. 1A) corresponding to the center axis of a liquid crystal domain formed in the pixel (in this case, the entire pixel is a transmission region). By providing the cuts 113 as described above, the directions in which liquid crystal molecules fall during voltage application are defined, allowing formation of two liquid crystal domains. The shape of the cuts 113 acting to define the directions in which liquid crystal molecules in axisymmetrically aligned domains fall with an electric field is determined so that roughly the same alignment regulating force can be exerted to the adjacent axisymmetrically aligned domains, and is preferably a tetragon, for example.

The reason why no cuts are provided on the left side of the pixel electrode 111 as viewed from FIG. 1A is that substantially the same function is obtained from cuts provided on the right side of the adjacent pixel electrode (not shown) located left to the illustrated pixel electrode 111, and thus cuts, which may decrease the effective aperture ratio of the pixel, are omitted on the left side of the pixel electrode 111. Also, in the illustrated example, the wall structure 115 to be described later gives the alignment regulating force. Therefore, with no cuts provided on the left side of the pixel electrode 111, the resultant liquid crystal domain is as stable as a liquid crystal domain having such cuts. In addition, the effect of improving the effective aperture ratio is obtained.

Although a total of four cuts 113 were formed in the illustrated example, at least one cut between the adjacent liquid crystal domains is sufficient. For example, an elongate cut may be formed in the center of the pixel and the other cuts may be omitted.

Each of the shading conductive layers 116a is formed to cover a region including two opposing sides of the two cuts 113 opposed each other. In formation of the cuts 113 by etching, overetching, peeling off of a conductive film (an ITO film in the illustrated example) constituting the pixel electrode 111 and the like may occur and, as a result, the conductive film constituting the pixel electrode 111 may be cut off. Even in such a case, electrical connection can be secured with the shading conductive layer 116a, and thus formation of a region shut off from supply of a predetermined voltage in the pixel is prevented. Hence, it is possible to prevent/suppress occurrence of a display defect due to cutting off (disconnection) of the pixel electrode 111.

The shading conductive layer 116a is not necessarily formed to cover a region including two opposing sides of two cuts 113, but may be formed between the two opposing sides. For example, in an etching process, a crack so long as to connect the two cuts 113 may be produced in a conductive film constituting the pixel electrode 111, and this may result in cutting off of the conductive film causing connection failure in the pixel electrode. To prevent such disconnection in the pixel electrode due to a crack, the shading conductive layer 116a does not necessarily overlap part of the cuts 113 but may only be formed on a portion in which a crack is likely to occur (in the illustrated example, a portion between the two opposing sides of the two cuts 113). In other words, connection failure as described above can be prevented by forming a shading conductive layer at least in the vicinity of the cuts 113 (or openings) in which a crack is likely to occur.

The openings 114 are formed to fix the center axes of the axisymmetrically aligned domains. With the openings 114 formed in the pixel electrode 111, depressions are formed on the surfaces of the shading conductive layers 116b covering the openings 114. With the effect of the shape of the depressions, the directions of tilt of liquid crystal molecules are defined and the center axes of the axisymmetric alignment are fixed/stabilized. The shape of the openings 114 for formation of the depressions for fixing the center axes of the axisymmetrically aligned domains is preferably circular as illustrated, but not limited to this. To exert roughly equal alignment regulating force in all directions, the shape is preferably a polygon having four or more sides and more preferably a regular polygon.

The shading conductive layers 116b covering the openings 114 act to suppress light leakage from near the center axes of the axisymmetric alignment formed in about the center of the liquid crystal domains. As described above, liquid crystal molecules near the alignment regulating structures are inclined more greatly (closer to the horizon) than liquid crystal molecules in the other regions. Regions having such alignment regulating structures are therefore observed as brighter than the other regions in the normally black display. In particular, the physical alignment regulating structures exert their alignment regulating forces even during non-voltage application. Light leakage therefore occurs even in the black display state and this causes reduction in contrast ratio. The depressions on the surfaces of the shading conductive layers 116b formed with the openings 114 define the directions of tilt of liquid crystal molecules with their shape effect. In addition, each of the openings 114, formed for fixing the center axis of the axisymmetric alignment of the liquid crystal domain, is located in about the center of the sub-pixel. If light leakage occurs near the opening 114, therefore, reduction in contrast ratio is eminent. By providing the shading conductive layer 116b to cover the opening 114, the reduction in contrast ratio can be suppressed. The shading conductive layers 116a formed to cover part of the cuts 113 also act to suppress light leakage near the cuts 113. However, to ensure sufficient exertion of the effect of the inclined electric field with the cuts 113, it is not preferred to cover a wide area of the cuts 113 with the shading conductive layers 116a, but is preferred to form the shading conductive layers 116a to selectively cover only part of the cuts 113 for prevention of occurrence of disconnection in the pixel electrode 111 as described above. The shading conductive layers 116a and 116b can be formed of the same film (metal film, for example).

The preferred size of the opening 114 depends on the size of the sub-pixel (liquid crystal domain). Preferably, however, the diameter is 10 µm or less when the opening is a circle (the length of the longest side when it is a polygon). The diameter of the shading conductive layer 116b covering the opening 114 (the length of the longest side when the layer is a polygon) is preferably greater by about 20% than the diameter of the opening 114 in consideration of the positioning precision. If the size of the opening 114 is greater than the above value, the area of the shading conductive layer 116b increases resulting in disadvantageously decreasing the effective aperture ratio. The step of the depression formed on the surface of the shading conductive layer 116b corresponding to the opening 114 is preferably 0.1 µm or more, more preferably 0.15 µm or more, to ensure the effect of fixing/stabilizing the center axis of the axisymmetric alignment.

The LCD device 100 has a shading region between the adjacent pixels, and the wall structure 115 is placed on the transparent substrate 110a in the shading region. The shading region as used herein refers to a region shaded from light due to the presence of TFTs, gate signal lines and source signal lines formed on the peripheries of the pixel electrodes 111 on the transparent substrate 110a, or the presence of the black matrix formed on the transparent substrate 110b, for example. Since this region does not contribute to display, the wall structure 115 formed in the shading region is free from adversely affecting the display.

The illustrated wall structure 115 is a continuous wall surrounding the pixel. Alternatively, the wall structure 115 may be composed of a plurality of separate walls. The wall structure 115, which serves to define boundaries of liquid crystal domains located near the outer edges of the pixel, should preferably have a length of some extent. For example, when the wall structure is composed of a plurality of walls, each wall is preferably longer than the gap between the adjacent walls.

Supports 133 for defining the thickness of the liquid crystal layer 120 (also called the cell gap) are preferably formed in the shading region (in the illustrated example, the region defined by the black matrix 132) to avoid degradation in display quality due to the supports. Although the supports 133 are formed on the wall structure 115 provided in the shading region in the illustrated example, the supports 133 may be formed on either transparent substrate 110a or 110b. In the case of forming the supports 133 on the wall structure 115, setting is made so that the sum of the height of the wall structure 115 and the height of the supports 133 is equal to the thickness of the liquid crystal layer 120. If the supports 133 are formed in a region having no wall structure 115, setting is made so that the height of the supports 133 is equal to the thickness of the liquid crystal layer 120. The supports 133 can be formed by photolithography using a photosensitive resin, for example.

In the LCD device 100, when a predetermined voltage (voltage equal to or higher than a threshold voltage) is applied between the pixel electrode 111 and the counter electrode 131, two axisymmetrically aligned regions of which the center axes are stabilized in or near the two openings 114 (depressions on the shading conductive layers 116b) are formed, the pair of cuts 113 formed in the center of the pixel electrode 111 in the length direction define the directions in which liquid crystal molecules in the two adjacent liquid crystal domains fall with an electric field, and the wall structure 115 and the cuts 113 formed in the corners of the pixel electrode 111 define the directions in which liquid crystal molecules in the portions of the liquid crystal domains near the outer edges of the pixel fall with the electric field. The alignment regulating forces of the openings 114, the cuts 113 and the wall structure 115 are considered to act cooperatively, to stabilize the alignment of the liquid crystal domains.

On the surface of the transparent substrate 110a facing the liquid crystal layer 120, provided are active elements such as TFTs and circuit elements such as gate signal lines and source signal lines connected to TFTs (all of these elements are not shown). Herein, the transparent substrate 110a, together with the circuit elements and the pixel electrodes 111, the wall structure 115, the supports 133, the alignment film and the like described above formed on the transparent substrate 110a, are collectively called an active matrix substrate in some cases. Likewise, the transparent substrate 110b, together with the color filter layer 130, the black matrix 132, the counter electrode 131, the alignment film and the like formed on the transparent substrate 110b, are collectively called a counter substrate or a color filter substrate in some cases.

In the LCD device 100 shown in FIGS. 1A and 1B, the alignment regulating structures such as the cuts 113, the openings 114 and the wall structure 115 were placed only on the transparent substrate 110a. Alternatively, the alignment regulating structures may be formed on the transparent substrate 110b, or they may be formed on both transparent substrates. Placing the alignment regulating structures only on either one substrate has the advantage of simplifying the fabrication process. Placing openings for center fixing on both substrates has the advantage of further effectively fixing/stabilizing the center axis of the axisymmetric alignment, and thus reducing the display roughness and shortening the response time in grayscale display.

The wall structure 115, exerting its alignment regulating force even during non-voltage application, has the advantage of effectively stabilizing the axisymmetric alignment in a grayscale display state, but may be omitted depending on the use of the LCD device and the like. The opening 114, which serves to fix/stabilize the center axis of the axisymmetric alignment, provides the effect of improving the uniformity of display, but may be omitted depending on the use of the LCD device and the like.

Although omitted in the above description, the LCD device 100 further includes a pair of polarizing plates placed to face each other via the transparent substrates 110a and 110b. The polarizing plates are typically placed so that their transmission axes are orthogonal to each other. The LCD device 100 may further include a biaxial optical anisotropic medium layer and/or a uniaxial optical anisotropic medium layer, as will be described later.

(Transflective LCD Device)

Next, a transflective LCD device 200 of an embodiment according to the first aspect of the present invention will be described with reference to FIGS. 2A and 2B.

Figure 2A:
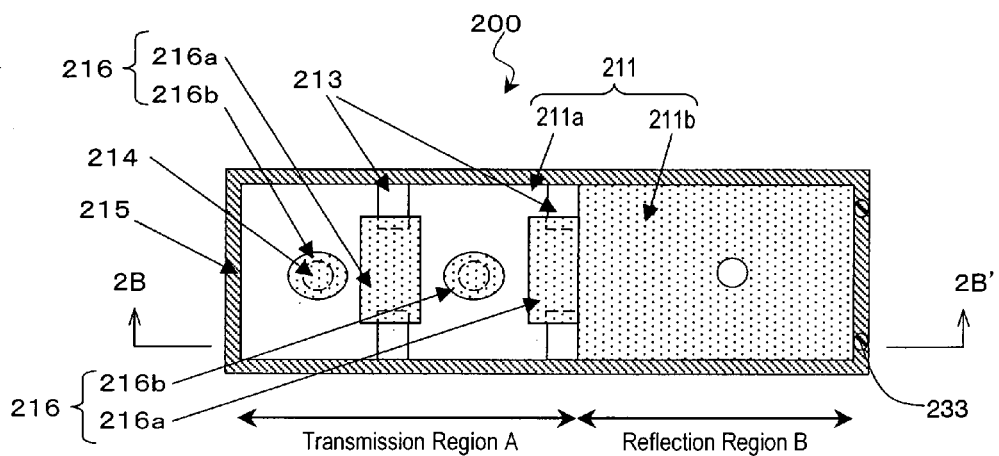
Figure 2B:
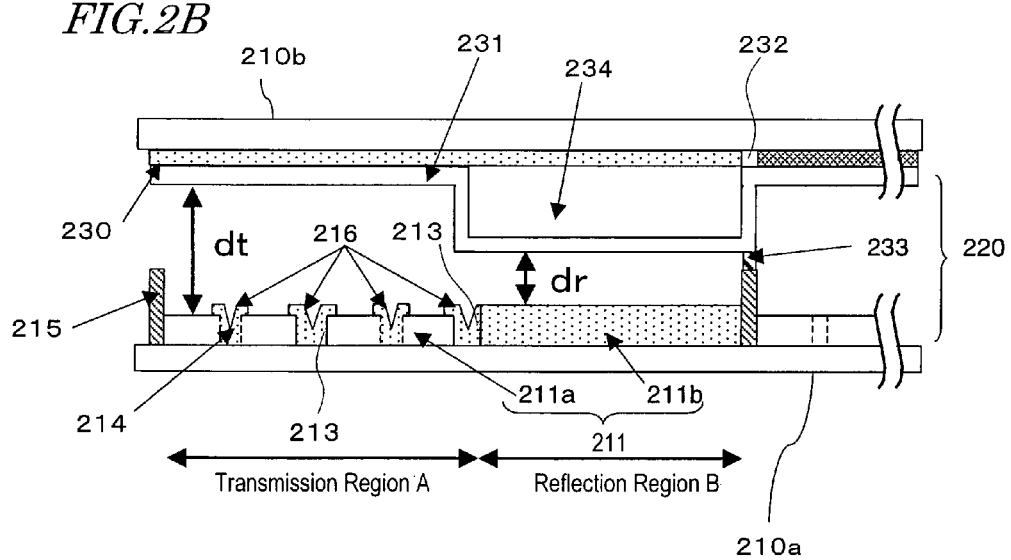

FIGS. 2A and 2B diagrammatically show one pixel of the transflective LCD device 200 of an embodiment of the present invention, in which FIG. 2A is a plan view and FIG. 2B is a cross-sectional view taken along line 2B-2B' in FIG. 2A.

Hereinafter, described will be a case that one pixel is divided into three parts (N=3; two for the transmission region and one for the reflection region). The number of parts into which one pixel is divided (=N) can be at least two (at least one for the transmission region and at least one for the reflection region) determined depending on the pixel pitch. The effective aperture ratio tends to decrease with increase of the number of divided parts (=N). Therefore, for an application to a high-definition display panel, the number of divided parts (=N) is preferably made small.

The LCD device 200 includes a transparent substrate (for example, a glass substrate) 210a, a transparent substrate 210b placed to face the transparent substrate 210a, and a vertically aligned liquid crystal layer 220 interposed between the transparent substrates 210a and 210b. Vertical alignment films (not shown) are formed on the surfaces of the substrates 210a and 210b facing the liquid crystal layer 220. During non-voltage application, therefore, liquid crystal molecules in the liquid crystal layer 220 are aligned roughly vertical to the surfaces of the vertical alignment films. The liquid crystal layer 220 includes a nematic liquid crystal material having negative dielectric anisotropy and also includes a chiral agent as required.

The LCD device 200 further includes pixel electrodes 211 formed on the transparent substrate 210a and a counter electrode 231 formed on the transparent substrate 210b. Each pixel electrode 211, the counter electrode 231 and the liquid crystal layer 220 interposed between these electrodes define a pixel. Circuit elements such as TFTs are formed on the transparent substrate 210a as will be described later. Herein, the transparent substrate 210a and the components formed thereon are collectively called an active matrix substrate 210a in some cases.

Typically, color filters 230 (the entire of the plurality of color filters may also be called a color filter layer 230) provided for the respective pixels, as well as a black matrix (shading layer) 232 provided in the gaps between the adjacent color filters 230, are formed on the surface of the transparent substrate 210b facing the liquid crystal layer 220, and the counter electrode 231 is formed on the color filters 230 and the black matrix 232. Alternatively, the color filters 230 and the black matrix 232 may be formed on the counter electrode 231 (on the surface thereof facing the liquid crystal layer 220). Herein, the transparent substrate 210b and the components formed thereon are collectively called a counter substrate (color filter substrate) 210b in some cases.

Each pixel electrode 211 includes a transparent electrode 211a formed of a transparent conductive layer (for example, an ITO layer) and a reflective electrode 211b formed of a metal layer (for example, an Al layer). Having such a pixel electrode, each pixel includes a transmission region A defined by the transparent electrode 211a and a reflection region B defined by the reflective electrode 211b, to provide display in the transmission mode and display in the reflection mode, respectively.

In the LCD device 200 shown in FIGS. 2A and 2B, in which the number of divided parts (=N) is 3 (two for the transmission region and one for the reflection region), a wall structure 215 to be described later extends in a shading region around each pixel electrode 211. The pixel electrode 211 has openings 214 of the number corresponding to the number of divided parts (n=3 in the illustrated example) at predetermined positions in the pixel, and also has four cuts 213 at predetermined positions. The LCD device 200 also includes a shading conductive layer 216 formed at predetermined positions in each pixel. The illustrated shading conductive layer 216 has shading conductive layers 216b formed to cover the openings 214 in the pixel electrode 211 and shading conductive layers 216a formed to cover part of the cuts 213. Each of the shading conductive layers 216a covering part of the cuts 213 is placed to cover a region including two opposing sides of the two cuts 113 opposed each other.

When a predetermined voltage is applied across the liquid crystal layer, three (number equal to the number of divided parts N) liquid crystal domains each having axisymmetric alignment are formed, with the center axes of the axisymmetric alignment of the liquid crystal domains being in or near the openings 214 (that is, in or near depressions formed on the surfaces of the shading conductive layers 216b in correspondence with the openings 214). As will be described later, the openings 214 (the depressions of the shading conductive layers 216b) formed at predetermined positions of the pixel electrode 211 act to fix the positions of the center axes of the axisymmetric alignment.

The cuts 213, provided in the pixel electrode 211 near the boundaries of the axisymmetrically aligned domains, define the directions in which liquid crystal molecules fall with an electric field, and thus act to form the axisymmetrically aligned domains. An inclined electric field is generated around the cuts 213 with a voltage applied between the pixel electrode 211 and the counter electrode 231. With this inclined electric field, the directions of tilt of liquid crystal molecules are defined. The wall structure 215 also acts to define the directions of tilt of liquid crystal molecules during voltage application (during generation of an electric field) with its slope face effect. The alignment regulating force with the slope faces of the wall structure 115 acts even during non-voltage application, causing liquid crystal molecules to tilt. During voltage application, the inclined electric field with the cuts 213 and the action of an electric field distorted with the wall structure 215 define the directions of tilt of liquid crystal molecules, resulting in formation of the axisymmetric alignment as described above.

In the illustrated example, a total of four cuts 213 are given point-symmetrically with respect to the opening 214 corresponding to the center axis of a liquid crystal domain formed in the transmission region of the pixel (in this case, the right opening in the transmission region as viewed from FIG. 2A).

By providing the cuts 213 as described above, the directions in which liquid crystal molecules fall during voltage application are defined, allowing formation of three liquid crystal domains. The placement and preferred shapes of the wall structure 215, the openings 214 and the cuts 213 are the same as those described above in relation to the transmissive LCD device 100. In the example illustrated in FIGS. 2A and 2B, the transmission region A has two liquid crystal domains and the reflection region B has one liquid crystal domain. However, the arrangement is not limited to this. Each liquid crystal domain is preferably roughly square in shape from the standpoint of the viewing angle characteristics and the stability of alignment.

Each of the shading conductive layers 216a is formed to cover a region including two opposing sides of the two cuts 213 opposed each other. In formation of the cuts 213 by etching, overetching, peeling off of a conductive film (an ITO film in the illustrated example) constituting the pixel electrode 211 and the like may occur and, as a result, the conductive film constituting the pixel electrode 211 may be cut off. Even in such a case, electrical connection can be secured with the shading conductive layer 116a, and thus formation of a region shut off from supply of a predetermined voltage in the pixel is prevented. Hence, it is possible to prevent/suppress occurrence of a display defect due to cutting off (disconnection) of the pixel electrode 211. The shading conductive layers 216a (and the shading conductive layers 216b) may preferably be formed from the same layer as that for formation of the reflective electrode 211b at one time in the same step. This can suppress increase of the fabrication steps. Preferred examples of the material for forming the reflective electrode 211b and the shading conductive layers 216a and 216b include materials free from causing galvanic corrosion with the ITO layer constituting the transparent electrode 211a (for example, Ag, Ti, Ta, Mo, W, alloys thereof, and alloys of any of these materials and Al), and layered structures having any of the materials free from galvanic corrosion as an underlying layer (for example, structures having an Al layer on any of the above metal layers). Otherwise, a transparent electrode formed of a transparent conductive material less likely to cause galvanic corrosion with Al, such as IZO (InZnO) and ATO (SbSnO) may be used.

Al, Ag, Ti, Ta, Mo, W and alloys thereof can be used suitably because films thereof can be formed comparatively easily in a vacuum film formation process for electronic devices such as semiconductors and LCD devices, and also are suited for patterning by photolithography. Moreover, in transflective LCD devices, the shading conductive layers covering the cuts and the openings can be formed with the same material in the same film formation process as the reflective electrode film, and patterned into desired shapes by photolithography to be formed at predetermined positions. Therefore, with the formation of the shading conductive layers in the film formation process for the reflective electrodes, it is possible to shorten the process and improve the yield and thus reduce the fabrication cost.

The openings 214 are formed to fix the center axes of the axisymmetrically aligned domains. With the openings 214 formed in the pixel electrode 211, depressions are formed on the surfaces of the shading conductive layers 216b covering the openings 214. With the effect of the shape of the depressions, the directions of tilt of liquid crystal molecules are defined and the center axes of the axisymmetric alignment are fixed/stabilized. The shape of the openings 214 for formation of the depressions for fixing the center axes of the axisymmetrically aligned domains is preferably elliptic or circular as illustrated, but not limited to this. To exert roughly equal alignment regulating force in all directions, the shape is preferably a polygon having four or more sides and more preferably a regular polygon.

The shading conductive layers 216b covering the openings 214 act to suppress light leakage from near the center axes of the axisymmetric alignment formed in about the center of the liquid crystal domains. As described above, liquid crystal molecules near the alignment regulating structures are inclined more greatly (closer to the horizon) than liquid crystal molecules in the other regions. Regions having such alignment regulating structures are therefore observed as brighter than the other regions in the normally black display. In particular, the physical alignment regulating structures exert their alignment regulating force even during non-voltage application. This causes light leakage even in the black display state and resultantly reduces the contrast ratio. The depressions on the surfaces of the shading conductive layers 216b formed with the openings 214 define the directions of tilt of liquid crystal molecules with their shape effect. In addition, each of the openings 214, formed for fixing the center axis of the axisymmetric alignment of the liquid crystal domain, is located in about the center of the sub-pixel. If light leakage occurs near the opening 214, therefore, reduction in contrast ratio is eminent. By providing the shading conductive layer 216b to cover the opening 214, the reduction in contrast ratio can be suppressed. Each of the shading conductive layers 216a formed to cover part of the cuts 213 also acts to suppress light leakage near the cuts 213. However, to ensure sufficient exertion of the effect of the inclined electric field with the cuts 213, it is not preferred to cover a wide area of the cuts 213 with the shading conductive layers 216a, but is preferred to form the shading conductive layers 216a to selectively cover only part of the cuts 213 for prevention of occurrence of disconnection in the pixel electrode 211. The shading conductive layer 216a does not necessarily overlap part of the cuts 213, but may only be formed on a portion in which a crack is likely to occur (in the illustrated example, a portion between the two opposing sides of the two cuts 213) as described above.

The LCD device 200 has a shading region between the adjacent pixels, and the wall structure 215 extends on the transparent substrate 210a in the shading region. Since the shading region does not contribute to display, the wall structure 215 formed in the shading region is free from adversely affecting the display. The wall structure 215 shown in the illustrated example is a continuous wall surrounding the pixel. Alternatively, the wall structure 215 may be composed of a plurality of separate walls. The wall structure 215, which serves to define boundaries of liquid crystal domains located near the outer edges of the pixel, should preferably have a length of some extent. For example, when the wall structure 215 is composed of a plurality of walls, each wall is preferably longer than the gap between the adjacent walls.

Supports 233 for defining the thickness of the liquid crystal layer 220 (also called the cell gap) should preferably be formed in the shading region (in the illustrated example, the region defined by the black matrix 232) to avoid degradation of the display quality due to the supports. Although the supports 233 are formed on the wall structure 215 provided in the shading region in the illustrated example, the supports 233 may be formed on either transparent substrate 210a or 210b. In the case of forming the supports 233 on the wall structure 215, setting is made so that the sum of the height of the wall structure 215 and the height of the supports 233 is equal to the thickness of the liquid crystal layer 220. If the supports 233 are formed in a region having no wall structure 215, setting is made so that the height of the supports 233 is equal to the thickness of the liquid crystal layer 220.

In the LCD device 200, when a predetermined voltage (voltage equal to or higher than a threshold voltage) is applied between the pixel electrode 211 and the counter electrode 231, three axisymmetrically aligned domains are formed with the center axes thereof being stabilized in or near the three openings 214. The four cuts 213 provided in the pixel electrode 211 define the directions in which liquid crystal molecules in the three adjacent liquid crystal domains fall with an electric field. The wall structure 214 stabilizes the boundaries of the liquid crystal domains located near the outer edges of the pixel.

In the LCD device 200 shown in FIGS. 2A and 2B, the alignment regulating structures such as the cuts 213, the openings 214 and the wall structure 215 were placed only on the transparent substrate 210a. Alternatively, the alignment regulating structures may be formed on the transparent substrate 210b, or they may be formed on both the transparent substrates. Placing the alignment regulating structures only on either one substrate has the advantage of simplifying the fabrication process. Placing openings for center fixing on both substrates has the advantage of further effectively fixing/stabilizing the center axis of the axisymmetric alignment, and thus reducing the display roughness and shortening the response time in grayscale display.

The wall structure 215, exerting its alignment regulating force even during non-voltage application, has the advantage of effectively stabilizing the axisymmetric alignment in a grayscale display state, but may be omitted depending on the use of the LCD device. The openings 214, which serve to fix/stabilize the center axis of the axisymmetric alignment, provide the effect of improving the uniformity of the display, but may be omitted depending on the use of the LCD device.

Next, a preferred construction specific to the transflective LCD device 200 permitting both the transmission-mode display and the reflection-mode display will be described.

While light used for display passes through the liquid crystal layer 220 once in the transmission-mode display, it passes through the liquid crystal layer 220 twice in the reflection-mode display. Accordingly, as diagrammatically shown in FIG. 2B, the thickness dt of the liquid crystal layer 220 in the transmission region A is preferably set roughly double the thickness dr of the liquid crystal layer 220 in the reflection region B. By setting in this way, the retardation given to the light by the liquid crystal layer 220 can be roughly the same in both display modes. Most preferably, dr=0.5 dt should be satisfied, but good display is secured in both display modes as long as 0.3 dt<dr<0.7 dt is satisfied. Naturally, dt=dr may be satisfied depending on the use.

In the LCD device 200, a transparent dielectric layer 234 is provided on the glass substrate 210b only in the reflection region B to make the thickness of the liquid crystal layer 220 in the reflection region B smaller than that in the transmission region A. This construction eliminates the necessity of providing a step by forming an insulating film and the like under the reflective electrode 211b, and thus has the advantage of simplifying the fabrication of the active matrix substrate 210a. If the reflective electrode 211b is formed on such an insulting film provided to give a step for adjusting the thickness of the liquid crystal layer 220, light used for transmission display will be shaded with the reflective electrode covering a slope (tapered face) of the insulating film, or light reflected from the reflective electrode formed on a slope of the insulating film will repeat internal reflection, failing to be effectively used even for reflection display. By adopting the construction described above, occurrence of such problems is prevented, and thus the light use efficiency can be improved.

If the transparent dielectric layer 234 is provided with a function of scattering light (diffuse reflection function), white display close to good paper white can be realized without the necessity of providing the reflective electrode 211b with the diffuse reflection function. Such white display close to paper white can also be realized by making the surface of the reflective electrode 211b uneven, and in this case, no light scattering function is necessary for the transparent dielectric layer 234. However, the uneven surface may fail to stabilize the position of the center axis of the axisymmetric alignment depending on the shape of the uneven surface. On the contrary, by combining the transparent dielectric layer 234 having the light scattering function and the reflective electrode 211b having a flat surface, the position of the center axis can be stabilized with the opening 214 (the depressions of the shading conductive layer 216b) formed in the reflective electrode 211b more reliably. Note that in the case of making the surface of the reflective electrode 211b uneven to provide the reflective electrode 211b with the diffuse reflection function, the uneven shape is preferably a continuous wave shape to prevent occurrence of an interference color, and such a shape is preferably set to allow stabilization of the center axis of the axisymmetric alignment.

While light used for display passes through the color filter layer 230 once in the transmission mode, it passes through the color filter layer 230 twice in the reflection mode. Accordingly, if the color filter layer 230 has the same optical density both in the transmission region A and the reflection region B, the color purity and/or the luminance may decrease in the reflection mode. To suppress occurrence of this problem, the optical density of the color filter layer in the reflection region is preferably made lower than that in the transmission region. The optical density as used herein is a characteristic value characterizing the color filter layer. For example, the optical density can be reduced by reducing the thickness of the color filter layer. Otherwise, the optical density can be reduced by reducing the density of a pigment added, for example, while keeping the thickness of the color filter layer unchanged.

Figure 3:
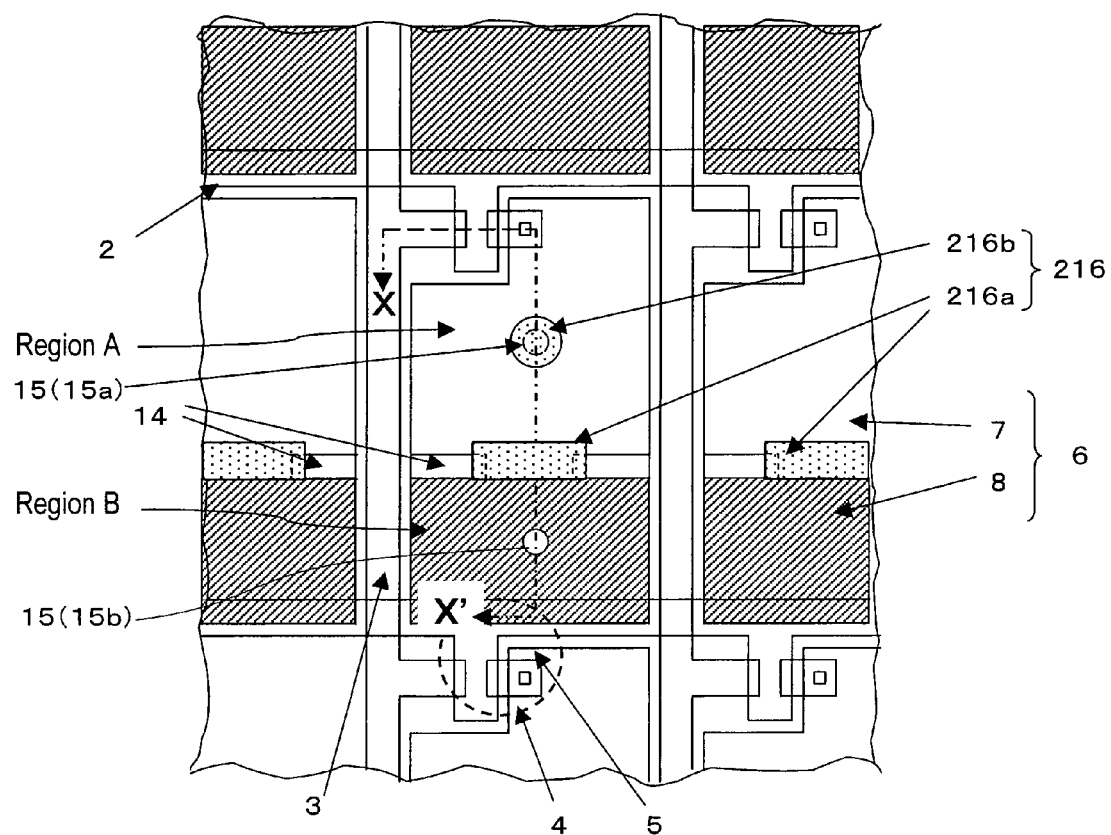
FIG. 3 is a plan view of an active matrix substrate 210a of the transflective LCD device 200.
Figure 4:
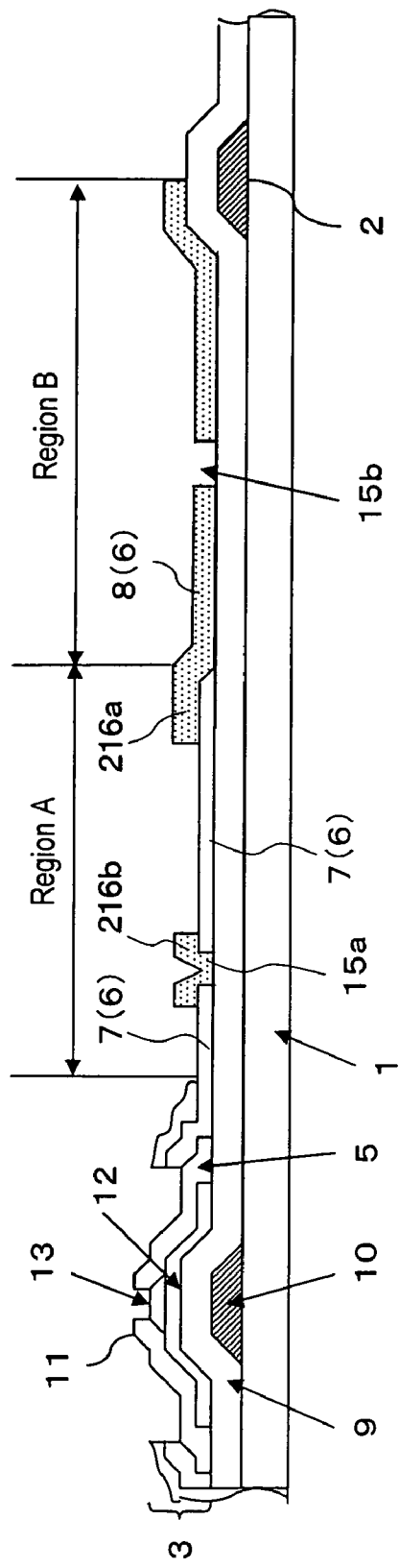
FIG. 4 is a cross-sectional view of the active matrix substrate 210a of the transflective LCD device 200.

Next, referring to FIGS. 3 and 4, an example of the structure of an active matrix substrate suitably used for the transflective LCD device will be described. FIG. 3 is a partial enlarged view of the active matrix substrate, and FIG. 4 is a cross-sectional view taken along line X-X' in FIG. 3. The active matrix substrate shown in FIGS. 3 and 4 can be the same in construction as the active matrix substrate 211a shown in FIGS. 2A and 2B, except that one liquid crystal domain is formed in the transmission region A (that is, the numbers of the openings 214 and the cuts 213 are reduced).

The active matrix substrate shown in FIGS. 3 and 4 has a transparent substrate 1 made of a glass substrate, for example. Gate signal lines 2 and source signal lines 3 run on the transparent substrate 1 to cross each other at right angles. TFTs 4 are formed near the crossings of these signal lines 2 and 3. Drain electrodes 5 of the TFTs 4 are connected to corresponding pixel electrodes 6.

Each of the pixel electrode 6 includes a transparent electrode 7 made of a transparent conductive layer such as an ITO layer and a reflective electrode 8 made of Al and the like. The transparent electrode 7 defines a transmission region A, and the reflective electrode 8 defines a reflection region B. Cuts 14 and openings 15 are formed at predetermined positions of the pixel electrode 6 for controlling the alignment of the axisymmetrically aligned domains as described above. Also, a shading conductive layer 216a is formed to cover two opposing sides of the two cuts 14 opposed each other, for prevention of occurrence of a display defect that may occur due to peeling off of a transparent conductive layer near the cuts 14. The shading conductive layer 216a is formed integrally with the reflective electrode 8. Also, a shading conductive layer 216b is formed to cover the opening 15a formed in the transparent electrode 7, for suppression/prevention of reduction in contrast ratio due to light leakage from near the opening 15a. No shading conductive layer is provided for covering the opening 15b formed in the reflective electrode 8. The opening 15b therefore defines the directions of tilt of liquid crystal molecules by generating an inclined electric field during voltage application, in addition to providing the effect of its concave shape. Hence, the effect of fixing/stabilizing the center axis of the axisymmetric alignment is higher in this case than the case of providing the shading conductive layer on the opening 15b. Although light leakage occurs near the opening 15b, it affects the contrast ratio less in the reflection region than in the transmission region. In view of the above, omitting the shading conductive layer to obtain greater alignment regulating force is more advantageous in some cases. Naturally, the shading conductive layer may be formed to cover the opening 15b if importance is attached to the contrast ratio.

A wall structure (not shown) is also placed in the non-display region (shading region) in which signal lines extend, outside the pixels in the above LCD device, for further stabilizing the axisymmetric domains.

The pixel electrode 6 overlaps the gate signal line for the next row via a gate insulating film 9, forming a storage capacitance. The TFT 4 has a multilayer structure including the gate insulating film 9, a semiconductor layer 12, a channel protection layer 13 and an n$^+$-Si layer 11 (source/drain electrodes) formed in this order on a gate electrode 10 branched from the gate signal line 2.

The illustrated TFT is of a bottom gate type. The TFT is not limited to this type, but a top gate type TFT can also be used.

(Operation principle)

The reason why the LCD device having a vertically aligned liquid crystal layer in the first aspect of the present invention has excellent wide viewing angle characteristics will be described with reference to FIGS. 5A, 5B, 6A and 6B.

Figure 5A:
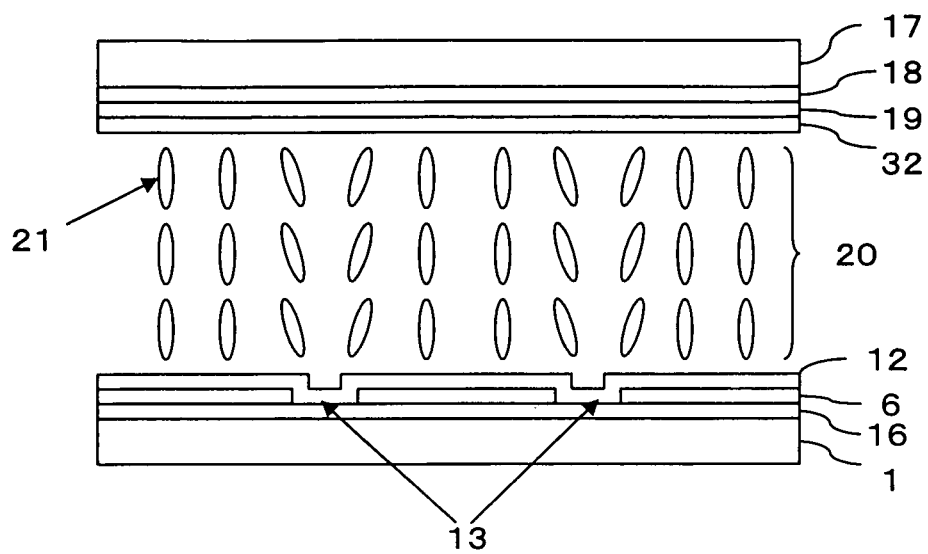
FIGS. 5A and 5B are diagrammatic views for demonstrating the operation principle of an LCD device of the present invention, showing the states during non-voltage application (FIG. 5A) and during voltage application (FIG. 5B).
Figure 5B:
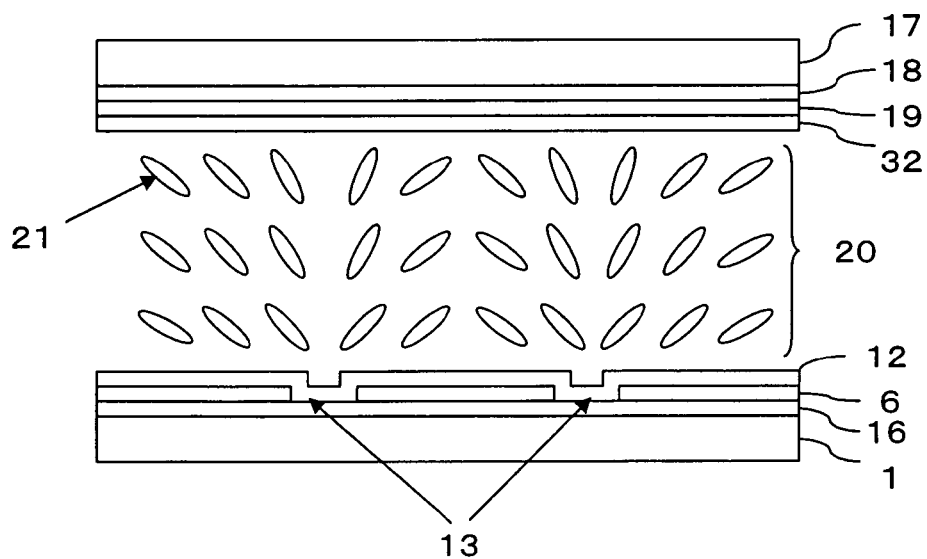

FIGS. 5A and 5B are views for demonstrating how the alignment regulating force of a cut 13 (or an opening that is not covered with a shading conductive layer (for example, the opening 15b in FIG. 3)) formed in a pixel electrode 6 acts, in which the aligned states of liquid crystal molecules during non-voltage application (FIG. 5A) and during voltage application (FIG. 5B) are diagrammatically shown. The state shown in FIG. 5B is for display of a grayscale level.

The LCD device shown in FIGS. 5A and 5B includes an insulating film 16, the pixel electrode 6 having the cuts 13 and an alignment film 12 formed in this order on a transparent substrate 1. The LCD device also includes a color filter layer 18, a counter electrode 19 and an alignment film 32 formed in this order on another transparent substrate 17. A liquid crystal layer 20 interposed between the two substrates includes liquid crystal molecules 21 having negative dielectric anisotropy.

As shown in FIG. 5A, during non-voltage application, the liquid crystal molecules 21 are aligned roughly vertical to the substrate surface with the alignment regulating force of the vertical alignment films 12 and 32, and are aligned axisymmetrically around the concave portion of each cut 13 in or near the cut 13 with the effect of its concave shape.

As shown in FIG. 5B, during voltage application, the liquid crystal molecules 21 having negative dielectric anisotropy attempt to make their major axes vertical to electric lines of force, and this causes the directions in which the liquid crystal molecules 21 fall to be defined with an inclined electric field generated around each cut 13. In this way, the liquid crystal molecules 21 are aligned axisymmetrically around the cut 13 as the center. In the resultant axisymmetrically aligned domain, liquid crystal directors point in all directions (directions in the substrate plane), and thus, excellent viewing angle characteristics can be obtained. The alignment of liquid crystal molecules around the center axis is continuous.

When a wall structure is provided in addition to the cuts 13 and/or openings, the side (wall) face of the wall structure defines the directions in which the liquid crystal molecules 21 fall with the alignment regulating force. Since the wall structure is typically covered with a vertical alignment film, the alignment regulating force exerts to align the liquid crystal molecules vertical to the wall face.

Figure 6A:
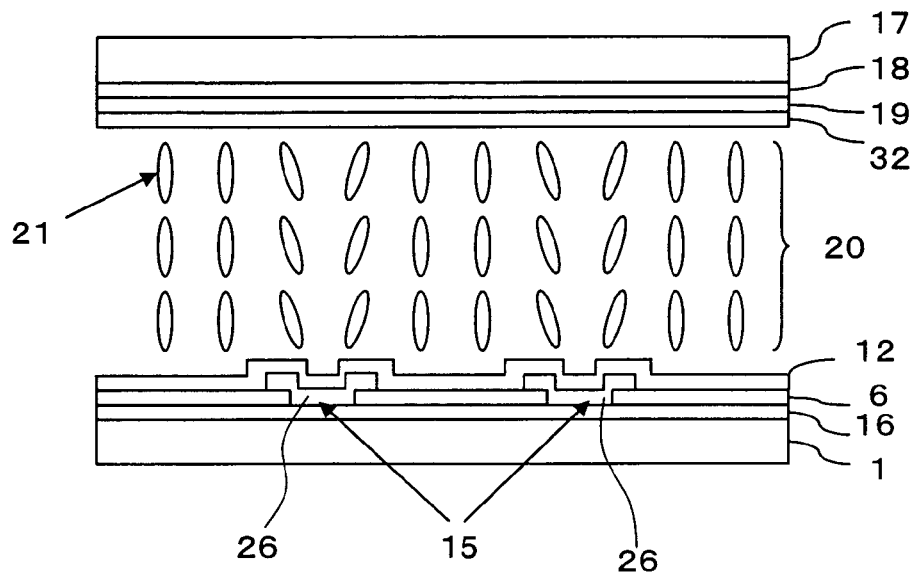
FIGS. 6A and 6B are other diagrammatic views for demonstrating the operation principle of LCD devices of the present invention, showing the construction having shading conductive layers covering openings (FIG. 6A) and the construction in which an insulating layer underlying the openings have depressions (FIG. 6B).
Figure 6B:
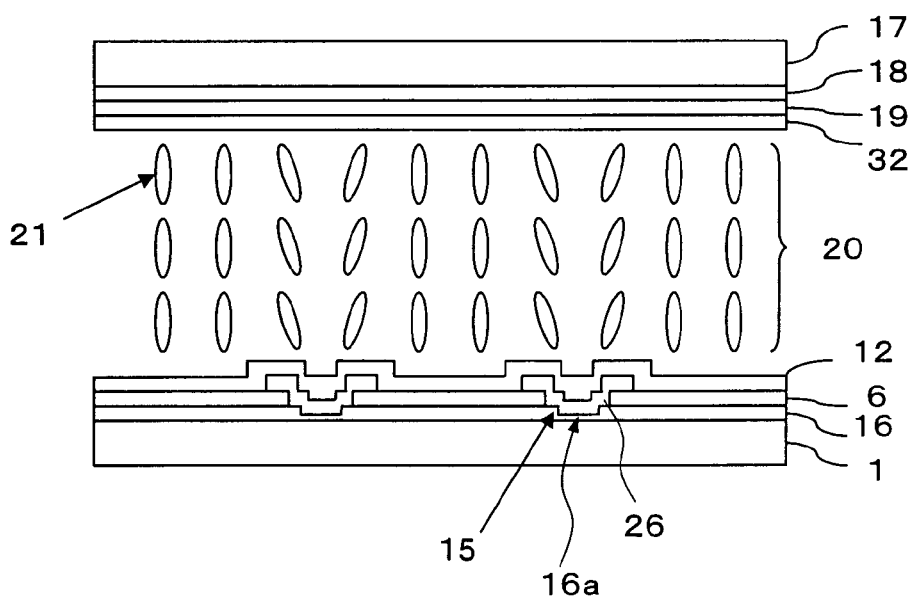

FIGS. 6A and 6B are views for demonstrating the action of the alignment regulating force observed when a shading conductive layer 26 is formed to cover each opening 15 in the pixel electrode 6. FIG. 6A shows the construction exemplified in the embodiment described above. In FIG. 6B, depressions 16a are formed on an underlying insulating layer 16 at the positions under the openings 15. Both FIGS. 6A and 6B diagrammatically show the aligned state of the liquid crystal molecules during non-voltage application.

The aligned state of liquid crystal molecules shown in FIG. 6A is substantially the same as that shown in FIG. 5A. That is, the alignment direction of liquid crystal molecules is defined by the effect of the shape of the depressions formed by the openings 15. However, in FIG. 6A, no inclined electric field is generated near the openings 15 during voltage application. Therefore, as the liquid crystal molecules defined by the initial alignment with the depressions tilt with the electric field, liquid crystal molecules surrounding the liquid crystal molecules defined with the depressions start to be aligned to match with the liquid crystal molecules defined with the depressions, resulting in formation of axisymmetric alignment. Since the openings 15 are covered with the shading conductive layers 26, the alignment regulating force is weak with no formation of an inclined electric field, but light leakage near the openings 15 is suppressed.

When the depressions (steps) obtained with the openings 15 are too shallow to provide sufficient alignment regulating force, depressions 16a may be formed on the underlying insulating layer 16 at the positions under the openings 15 as shown in FIG. 6B, to increase the steps of the depressions formed thereon. As described above, the depth of the depressions 16a of the insulating layer 16 may be determined so that a step of preferably 0.1 µm or more, more preferably 0.15 µm or more, is formed on the surface facing the liquid crystal layer, to ensure the sufficient effect of fixing/stabilizing the center axis of the axisymmetric alignment on the surface. On the insulating layer (a resin layer having a thickness of 3 µm, for example) 16, the pixel electrode (an ITO layer having a thickness of 150 nm, for example) 6, the shading conductive layer (an Al layer having a thickness of 200 nm, for example) 26 and an alignment film (a vertical alignment film having a thickness of 80 nm, for example) 12. In consideration of the above, the depth of the depression 16a is preferably 0.5 µm or more. If a depression having a depth exceeding 2 µm is formed on the surface contacting the liquid crystal layer, light leakage will disadvantageously increase because liquid crystal molecules tilt near the side faces of the depression.

Next, an example of more specific construction of the LCD device according to the present invention will be described with reference to FIG. 7.

Figure 7:
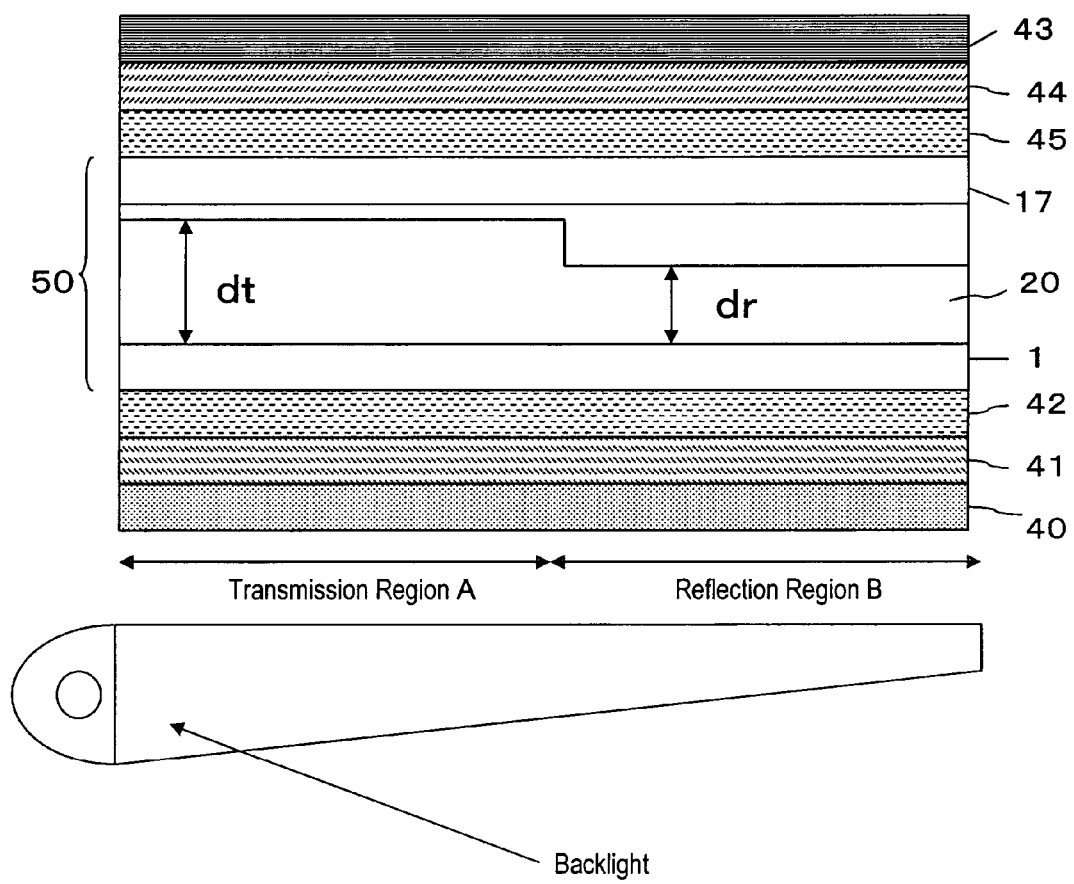
FIG. 7 is a diagrammatic view showing an example of construction of an LCD device of an embodiment of the present invention.

The LCD device shown in FIG. 7 includes: a backlight; a transflective liquid crystal panel 50; a pair of polarizing plates 40 and 43 placed to face each other via the transflective liquid crystal panel 50; quarter wave plates 41 and 44 respectively placed between the polarizing plates 40 and 43 and the liquid crystal panel 50; and phase plates 42 and 45 having negative optical anisotropy respectively placed between the wave plates 41 and 44 and the liquid crystal panel 50. The liquid crystal panel 50 includes a vertically aligned liquid crystal layer 20 between a transparent substrate (active matrix substrate) 1 and a transparent substrate (counter substrate) 17. As the liquid crystal panel 50, one having the same construction as that of the LCD device 200 shown in FIGS. 2A and 2B is used.

The display operation of the LCD device shown in FIG. 7 will be briefly described.

In reflection-mode display, light incident from above passes through the polarizing plate 43 to be output as linearly polarized light. The linearly polarized light is changed to circularly polarized light with the quarter wave plate 44 placed so that the slower axis thereof forms 45° with the transmission axis of the polarizing plate 43. The circularly polarized light passes through the color filter layer (not shown) formed on the substrate 17. In the illustrated example, the phase plate 45 provides no phase difference for light incident in the normal direction.

During non-voltage application, in which liquid crystal molecules in the liquid crystal layer 20 are aligned roughly vertical to the substrate plane, incident light passes through the liquid crystal layer 20 with a phase difference of roughly 0 and is reflected with the reflective electrode formed on the lower substrate 1. The reflected circularly polarized light passes again through the liquid crystal layer 20 and the color filter layer. The light then passes through the phase plate 45 having negative optical anisotropy as the circularly polarized light, to enter the quarter wave plate 44, where the light is changed to linearly polarized light having a polarizing direction orthogonal to the polarizing direction given to the incident light after first passing through the polarizing plate 43, and reaches the polarizing plate 43. The resultant linearly polarized light fails to pass through the polarizing plate 43, and thus black display is provided.

During voltage application, in which the liquid crystal molecules in the liquid crystal layer 20 are tilted toward the horizontal direction from the direction vertical to the substrate plane, the incident circularly polarized light is changed to elliptically polarized light due to birefringence of the liquid crystal layer 20, and reflected with the reflective electrode formed on the lower substrate 1. The polarized state of the reflected light is further changed during passing back through the liquid crystal layer 20. The reflected light passes again through the color filter layer and then the phase plate 45 having negative optical anisotropy, to enter the quarter wave plate 44 as the elliptically polarized light. Accordingly, when reaching the polarizing plate 43, the light is not linearly polarized light having a polarizing direction orthogonal to the polarizing direction given to the original incident light, and thus passes through the polarizing plate 43. That is to say, by adjusting the applied voltage, the degree of the tilt of the liquid crystal molecules can be controlled, and thus the amount of reflected light allowed to pass through the polarizing plate 43 can be changed, to thereby enable grayscale display.

In transmission-mode display, the upper and lower polarizing plates 43 and 40 are placed so that the transmission axes thereof are orthogonal to each other. Light emitted from a light source is changed to linearly polarized light at the polarizing plate 40, and then changed to circularly polarized light when being incident on the quarter wave plate 41 placed so that the slower axis thereof forms 45° with the transmission axis of the polarizing plate 40. The circularly polarized light then passes through the phase plate 42 having negative optical anisotropy and is incident on the transmission region A of the lower substrate 1. In the illustrated example, the phase plate 42 provides no phase difference for light incident in the normal direction.

During non-voltage application, in which liquid crystal molecules in the liquid crystal layer 20 are aligned roughly vertical to the substrate plane, the incident light passes through the liquid crystal layer 20 with a phase difference of roughly 0. That is, the light incident on the lower substrate 1 as circularly polarized light passes through the liquid crystal layer 20 and then the upper substrate 17 in this state. The light then passes through the upper phase plate 45 having negative optical anisotropy, to enter the quarter wave plate 44. The lower and upper quarter wave plates 41 and 44 are placed so that the slower axes thereof are orthogonal to each other. Therefore, a phase difference in the polarized light that has entered the quarter wave plate 44, which was given at the lower quarter wave plate 41, can be cancelled with the quarter wave plate 44, and thus the light resumes the, original linearly polarized light. The polarized light coming from the upper quarter wave plate 44 is therefore linearly polarized light having the polarizing direction parallel with the transmission axis (polarizing axis) of the polarizing plate 40, and thus absorbed with the polarizing plate 43 of which the transmission axis is orthogonal to that of the polarizing plate 40. Accordingly, black display is provided.

During voltage application, in which the liquid crystal molecules in the liquid crystal layer 20 are tilted toward the horizontal direction from the direction vertical to the substrate plane, the incident circularly polarized light is changed to elliptically polarized light due to birefringence of the liquid crystal layer 20. The light then passes through the color filter layer 17, the phase plate 45 having negative optical anisotropy, and the quarter wave plate 44 as the elliptically polarized light. Accordingly, when reaching the polarizing plate 43, the light is not linearly polarized light orthogonal to the polarized component in the original incident light, and thus passes through the polarizing plate 43. That is to say, by adjusting the applied voltage, the degree of the tilt of the liquid crystal molecules can be controlled, and thus the amount of light allowed to pass through the polarizing plate 43 can be changed, to thereby enable grayscale display.

The phase plate having negative optical anisotropy minimizes the amount of change in phase difference occurring with change of the viewing angle when the liquid crystal molecules are in the vertically aligned state, and thus suppresses black floating observed when the display device is viewed at a wide viewing angle. In place of the combination of the phase plate having negative optical anisotropy and the quarter wave plate, a biaxial phase plate unifying the functions of both plates may be used.

When axisymmetrically aligned domains are used to implement the normally black mode that presents black display during non-voltage application and white display during voltage application, as in the present invention, a polarizing plate-caused extinction pattern can be eliminated by placing a pair of quarter wave plates on the top and bottom of the LCD device (panel), and thus the brightness can be improved. Also, when axisymmetrically aligned domains are used to implement the normally black mode with upper and lower polarizing plates placed so that the transmission axes thereof are orthogonal to each other, it is theoretically possible to present black display of substantially the same level as that obtained when a pair of polarizing plates are placed under crossed nicols. Therefore, a considerably high contrast ratio can be obtained, and also, with the all-direction alignment of liquid crystal molecules, wide viewing angle characteristics can be attained.

Figure 8:
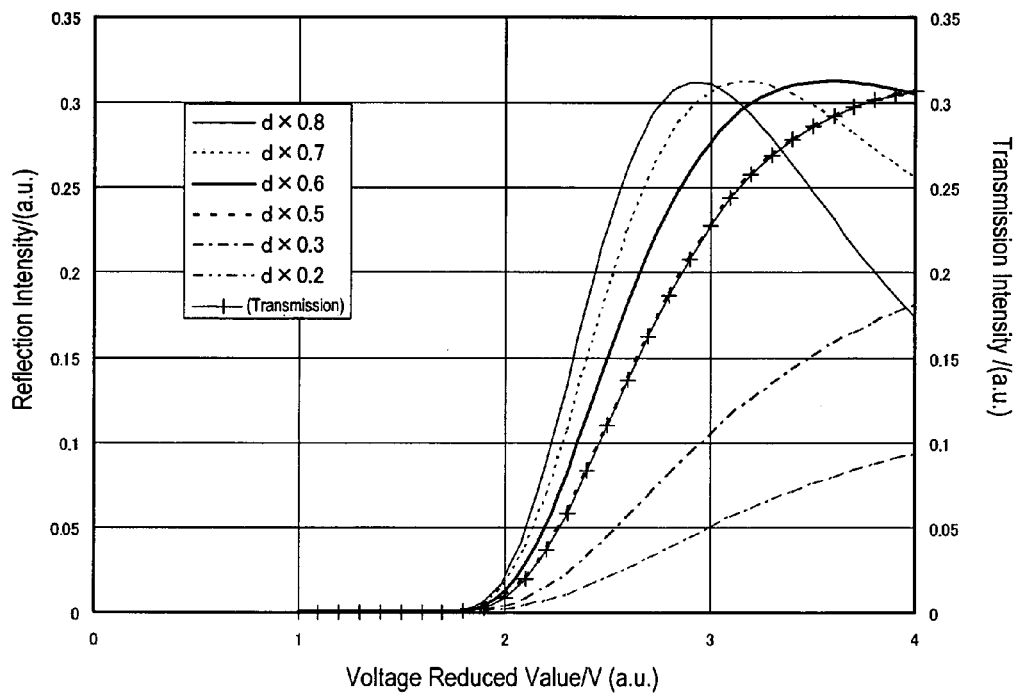
FIG. 8 is a graph showing the dependence of the voltage-reflectance (transmittance) of a transmission region and a reflection region on the thickness of the liquid crystal layer in an LCD device of an embodiment of the present invention.

The thicknesses dt and dr of the liquid crystal layer in the transmission region and the reflection region defined in the present invention preferably has the relationship satisfying 0.3 dt<dr<0.7 dt, more preferably 0.4 dt<dr<0.6 dt, as is found from the dependence of the voltage-reflectance (transmittance) of the transmission region and the reflection region on the thickness of the liquid crystal layer shown in FIG. 8. If the thickness of the liquid crystal layer in the reflection region is smaller than the lower limit, the reflectance will be 50% or less of the maximum reflectance, failing to provide sufficiently high reflectance. If the thickness dr of the liquid crystal layer in the reflection region is greater than the upper limit, the peak of the reflectance in the voltage-reflectance characteristics exists at a drive voltage different from that in the case of the transmission display. Also, the relative reflectance tends to be low at a white display voltage optimal for the transmission display. The reflectance is as low as 50% or less of the maximum reflectance, failing to provide sufficiently high reflectance. Since the optical length in the liquid crystal layer in the reflection region B is double that in the transmission region, the birefringence anisotropy (Δn) of the liquid crystal material and the panel cell thickness design are very important when the same design is made for both the transmission region and the reflection region.

Specific characteristics of the transflective LCD device of the embodiment of the present invention will be described as follows.

An LCD device having the construction shown in FIG. 7 was fabricated. As the liquid crystal cell 50, one having the same construction as that of the LCD device 200 shown in FIGS. 2A and 2B was used. A transparent dielectric, layer having no light scattering function was formed as the transparent dielectric layer 234, and a resin layer having a continuous uneven surface was formed under the reflective electrode 211b, to adjust the diffuse reflection characteristics in the reflection display.

In the example, a pair of cuts were formed near the boundary between the transmission region and the reflection region, to control the tilt alignment of liquid crystal molecules using a distortion of an electric field. Also, an opening was formed in an electrode roughly in the center of a liquid crystal domain in the pixel region, to fix/stabilize the position of the center axis of the axisymmetric alignment. In addition, a wall structure was formed in the shading region outside the pixel region so as to regulate the directions of tilt of liquid crystal molecules from the periphery of the pixel. According to the first aspect of the present invention, the same Al film as that used as the reflective electrode film in the reflection region was formed to cover a region near the pair of cuts and also the opening formed roughly in the center of a liquid crystal domain in the pixel, in the same vacuum film formation process, and patterned in a predetermined photographic process. As a result, occurrence of a display defect due to peeling off of a pixel electrode film near the cuts was prevented. Also, reduction in contrast due to alignment disorder near the step of the opening in the center of the pixel during black display was suppressed with the shading effect using the metal conductive film.

In the LCD device of the above example, the vertical alignment films were formed by a known method. No rubbing was made. A liquid crystal material having negative dielectric anisotropy (Δn: 0.1 and Δε: −4.5) was used. In this example, the thicknesses dt and dr of the liquid crystal layer in the transmission region and the reflection region were set at 4 μm and 2.2 μm, respectively (dr=0.55 dt).

The LCD device of this example had a multilayer structure composed of a polarizing plate (observer side), a quarter wave plate (phase plate 1), a phase plate having negative optical anisotropy (phase plate 2 (NR plate)), the liquid crystal layer (on the upper and lower sides thereof, the color filter substrate and the active matrix substrate were respectively placed), a phase plate having negative optical anisotropy (phase plate 3 (NR plate)), a quarter wave plate (phase plate 4), and a polarizing plate (backlight side) in the order from the observer side. The upper and lower quarter wave plates (phase plates 1 and 4) were placed so that the slower axes thereof were orthogonal to each other, and had a phase difference of 140 nm. The phase plates having negative optical anisotropy (phase plates 2 and 3) had a phase difference of 135 nm. The two polarizing plates were placed so that the absorption axes thereof were orthogonal to each other.

Figure 9:
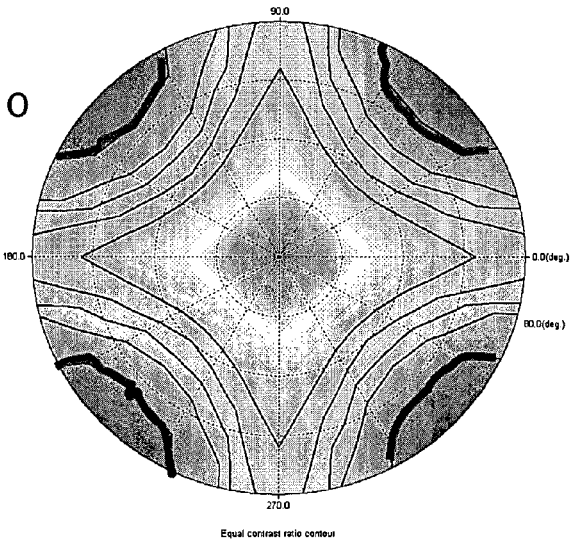
FIG. 9 is a view showing the visual angle—contrast ratio characteristics of an LCD device of an embodiment of the present invention.

A drive signal was applied to the thus-obtained LCD device (4V was applied across the liquid crystal layer) to evaluate the display characteristics. No black point or the like accompanying a display defect of a pixel was recognized in full-lighting inspection of the LCD device. The results of the visual angle—contrast characteristics in the transmission display are shown in FIG. 9. The viewing angle characteristics in the transmission display were roughly symmetric in all directions, the range CR>10 was as large as up to ±80°, and the transmission contrast was as high as 300:1 or more at the front.

As for the characteristics of the reflection display, the reflectance evaluated with a spectral calorimeter (CM2002 from Minolta Co., Ltd.) was about 8.7% (value in terms of the aperture ratio of 100%) with respect to a standard diffuse plate as the reference. The contrast value of the reflection display was 23, which was high compared with the case of the conventional LCD devices.

As a comparative example, an LCD device having the openings, the cuts and the wall structure as those in the above example but having no shading conductive layer was fabricated. In full-lighting examination of this LCD device, black points (display defects) caused by peeling off of the pixel electrodes (transparent electrodes) were recognized. Moreover, in microscopic observation, light leakage near the depressions (steps) of the openings was observed, and reduction in contrast ratio due to the light leakage was recognized. In this comparative example, the contrast value in the transmission display during 4V voltage application was 280:1 at the front, which was slightly lower than that in the above example.

In the embodiment described above, vertically aligned LCD devices having axisymmetrically aligned liquid crystal domains were exemplified. Alternatively, the present invention is also applicable to MVA LCD devices.

[Transflective LCD Device having Transparent Dielectric Layer]

As described above, in the transflective LCD device, the thicknesses dt and dr of the liquid crystal layer in the transmission region and the reflection region are preferably set to satisfy the relationship 0.3 dt<dr<0.7 dt. Placing a transparent dielectric layer (thickness: dt−dr) on the surface of the counter substrate (typically, a color filter substrate) facing the liquid crystal layer eliminates the necessity of providing a step by forming an insulating film and the like under the reflective electrode, and thus has advantages such as simplifying the fabrication of the active matrix substrate 210a.

However, with the step formed by the transparent dielectric layer, the alignment of liquid crystal molecules in the pixel may be disturbed and this may make it difficult to form the axisymmetric alignment in each of the transmission region and the reflection region or control the center position of the axisymmetric alignment. As a result, display-related problems such as light leakage, visual angle dependence and roughness of display may arise.

Hereinafter, described will be a transflective LCD device of an embodiment according to the second aspect of the present invention that can suppress disturbance in the alignment of liquid crystal molecules caused by the step formed in the liquid crystal panel and thus can sufficiently stabilize the alignment of liquid crystal molecules and prevent occurrence of display failure. The LCD device according to the second aspect of the invention can be suitably combined with the transflective LCD device according to the first aspect of the invention described above.

A transflective LCD device 300 of an embodiment according to the second aspect of the present invention will be described with reference to FIGS. 10A, 10B and 11.

Figure 10A:
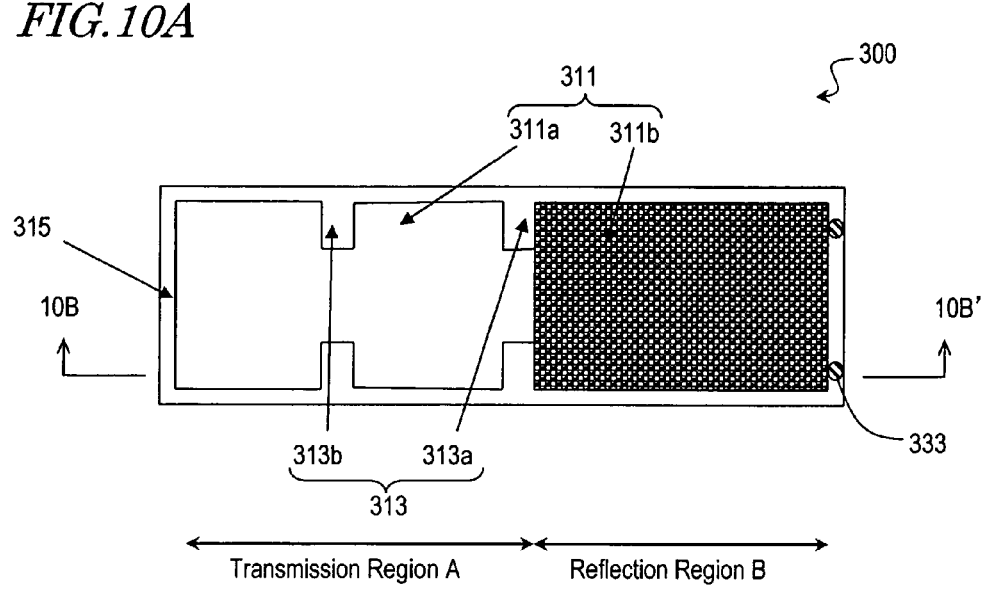
Figure 10B:
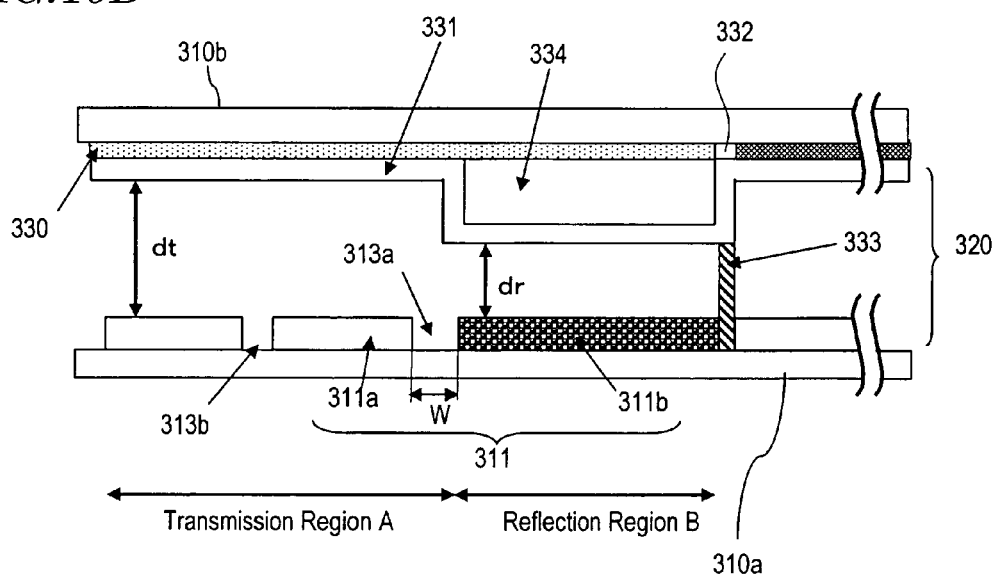
Figure 11:
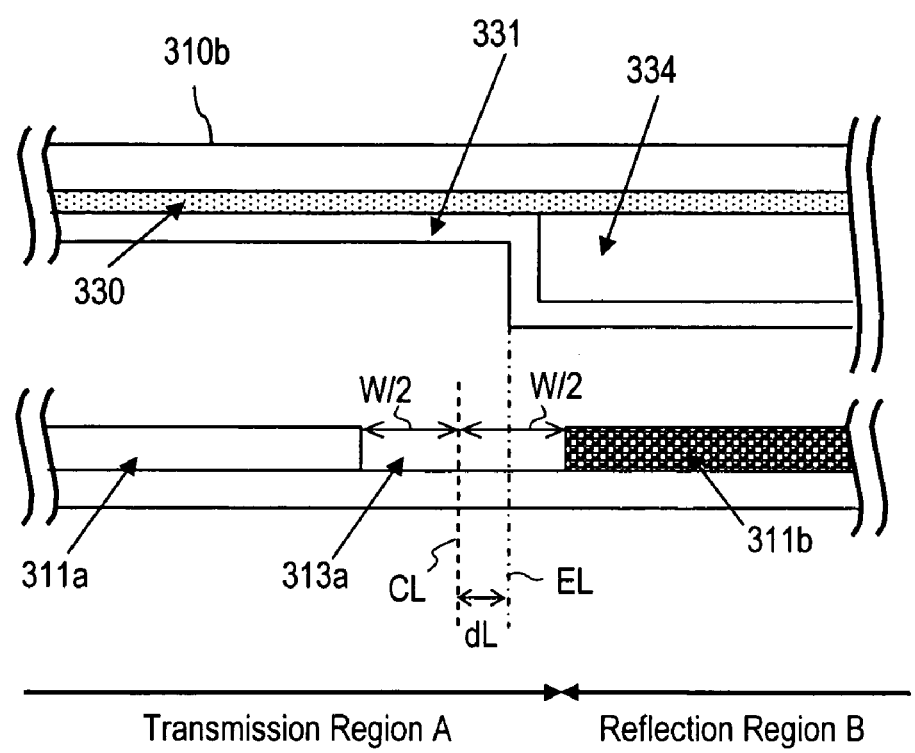
FIG. 11 is an enlarged view of the boundary between a reflection region and a transmission region in FIG. 10B.

FIGS. 10A and 10B diagrammatically show one pixel of the transflective LCD device 300 according to the second aspect of the present invention, in which FIG. 10A is a plan view and FIG. 2B is a cross-sectional view taken along line 10B-10B' in FIG. 10A. FIG. 11 is an enlarged view of the boundary between a reflection region and a transmission region in FIG. 10B. The transflective LCD device 300 is different from the transflective LCD device 200 shown in FIGS. 2A and 2B in the point that the placement of a transparent dielectric layer 334 with respect to cuts 313a is optimized as will be described later. Although the illustrated transflective LCD device 300 is not provided with the wall structure 215, the openings 214 and the shading conductive layers 216 of the transflective LCD device 200, these components are preferably provided as described earlier in detail. Description of the common components between the transflective LCD devices 200 and 300 is omitted here.

The transflective LCD device 300 includes a transparent substrate 310a, a transparent substrate 310b placed to face the transparent substrate 310a, and a vertically aligned liquid crystal layer 320 interposed between the transparent substrates 310a and 310b.

The LCD device 300 further includes pixel electrodes 311 formed on the transparent substrate 310a and a counter electrode 331 formed on the transparent substrate 310b. Each pixel electrode 311, the counter electrode 331 and the liquid crystal layer 320 interposed between these electrodes define a pixel. Circuit elements such as TFTs are formed on the transparent substrate 310a.

Typically, color filters 330 provided for the respective pixels, a black matrix (shading layer) 332 provided in the gaps between the adjacent color filters 330, and the transparent dielectric layer 334 are formed on the surface of the transparent substrate 310b facing the liquid crystal layer 320, and the counter electrode 331 is formed on these components.

Each pixel electrode 311 includes a transparent electrode 311a formed of a transparent conductive layer (for example, an ITO layer) and a reflective electrode 311b formed of a metal layer (for example, an Al layer, an alloy layer including Al, and a layered film including any of these). Having such a pixel electrode, each pixel includes a transmission region A defined by the transparent electrode 311a and a reflection region B defined by the reflective electrode 311b, to provide display in the transmission mode and display in the reflection mode, respectively.

While light used for display passes through the liquid crystal layer 320 once in the transmission-mode display, it passes through the liquid crystal layer 320 twice in the reflection-mode display. Accordingly, as diagrammatically shown in FIG. 10B, the thickness dt of the liquid crystal layer 320 in the transmission region A is preferably set roughly double the thickness dr of the liquid crystal layer 320 in the reflection region B. By setting in this way, the retardation given to the light by the liquid crystal layer 320 can be roughly the same in both display modes. Most preferably, dr=0.5 dt should be satisfied, but good display is secured in both display modes as long as 0.3 dt<dr<0.7 dt is satisfied.

In the LCD device 300 shown in FIGS. 10A and 10B, in which the number of divided parts (=N) is 3 (two for the transmission region and one for the reflection region), four cuts 313 are formed at predetermined positions in the pixel electrode 311. Two cuts 313a among the four cuts are formed between the transparent electrode 311a and the reflective electrode 311b. In the illustrated construction, the cuts 313a are located in the portion of the transparent electrode 311a adjacent to the reflective electrode 311b. The other two cuts 313b are located near the boundary of two axisymmetrically aligned domains formed in the transmission region A having the transparent electrode 311a (at the position roughly bisecting the transparent electrode 311a in the length direction). An inclined electric field is generated near the portions of the pixel electrode 311 having these four (two pairs of) cuts 313, to enable formation of three axisymmetrically aligned domains in the pixel.

A step is formed with the transparent dielectric layer 334 formed in the reflection region B on the surface of the counter substrate 310b facing the liquid crystal layer 320. The placement of the transparent dielectric layer 334 with respect to the cuts 313a is set so that the alignment of liquid crystal molecules near this step formed in the vicinity of the boundary between the transmission region A and the reflection region B (near the end face of the transparent dielectric layer 334) matches with the alignment of liquid crystal molecules given with the inclined electric field generated near the cuts 313a.

The above setting will be described in detail with reference to FIG. 11.

The transparent dielectric layer 334, placed to set the thickness dr of the liquid crystal layer 320 in the reflection region B, exists in at least the region opposed to the reflective electrode 311b, and in general, is formed to be slightly greater in size than the reflective electrode 311b in consideration of obliquely-traveling light. Hence, the end face of the transparent dielectric layer 334 near the boundary between the transmission region A and the reflection region B (extension line EL in FIG. 11) is located on the side of the transparent electrode 311a, not on the side of the reflective electrode 311b.

If the end face (EL) of the transparent dielectric layer 334 is located on the side of the transparent electrode 311a with respect to the center (extension line CL in FIG. 11) of the width W of the cut 313a, the alignment of liquid crystal molecules near the boundary between the liquid crystal domain formed in the transmission region A and the liquid crystal domain formed in the reflection region B is disturbed, and this tends to make the axisymmetric alignment formed in the transmission region and the reflection region unstable.

Table 1 below shows the results of an experiment. In Table 1, dL denotes the distance between the end face (EL) of the transparent dielectric layer 334 and the center (CL) of the width W of the cut 313a. The value of the distance is "positive" when the end face (EL) is on the side of the reflective electrode 311b with respect to the center (CL)(right as viewed from FIG. 11).

In this example, a liquid crystal material having negative dielectric anisotropy (Δn: 0.1 and Δ∈: −4.5) was used. The thicknesses dt and dr of the liquid crystal layer in the transmission region and the reflection region were set at 4 μm and 2.2 μm, respectively (dr=0.55 dt). The length of the pixel electrode in the shorter-side (width) direction) is 50 μm, the length thereof in the longer-side (length) direction is 160 μm, and the length of the cut (in the shorter-side direction of the pixel electrode) is 20 μm.

In Table 1, mark ○ represents that a total of three (two in the transmission region A and one in the reflection region B) axisymmetrically aligned domains were formed, and mark X represents that the three axisymmetrically aligned domains were not formed stably.

TABLE 1

| | dL [μm] | | | | | | | | | | | | |
|---|---|---|---|---|---|---|---|---|---|---|---|---|---|
| | −6 | −5 | −4 | −3 | −2 | −1 | 0 | 1 | 2 | 3 | 4 | 5 | 6 |
| W [μm]  2 | — | — | — | — | — | — | X | X | X | — | — | — | — |
| 4 | — | — | — | — | X | X | X | X | X | — | — | — | — |
| 6 | — | — | — | X | X | X | X | X | X | — | — | — | — |
| 7 | — | — | — | X | X | X | ○ | ○ | ○ | ○ | — | — | — |
| 8 | — | — | X | X | X | X | ○ | ○ | ○ | ○ | ○ | — | — |
| 10 | — | X | X | X | X | X | ○ | ○ | ○ | ○ | ○ | ○ | — |
| 12 | X | X | X | X | X | X | ○ | ○ | ○ | ○ | ○ | ○ | ○ |

As is found from the results in Table 1, to give stable axisymmetric alignment, the end face (EL) of the transparent dielectric layer 334 should preferably coincide with the center (CL) of the width W of the cut 313a (dL=0) or be located on the side of the reflective electrode 311b with respect to the center (CL), and the width W of the cut should be 7 μm or more.

The effect of the width W of the cut on the alignment of liquid crystal molecules was examined, and the results are as follows.

FIGS. 12A through 12F are views diagrammatically showing liquid crystal molecules LC (line segments in the figures) and equipotential lines EQ of an electric field generated in a liquid crystal layer, observed 200 msec after application of a white voltage (4V in the illustrated example) across the liquid crystal layer. The thickness of the liquid crystal layer was 4 μm, the refractive index anisotropy Δn was 0.1 and the dielectric anisotropy Δ∈ was −4.5. Walls (wall structure or projections) were placed on the surface of the counter electrode facing the liquid crystal layer at intervals of 30 μm, but the action of these walls on the action of the cuts is negligible.

Figure 12A:
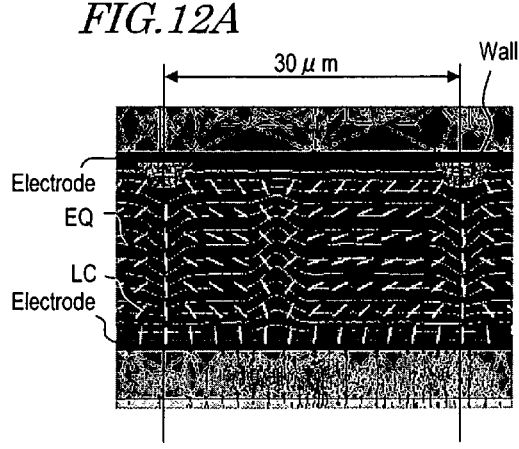
FIGS. 12A through 12F are views diagrammatically showing liquid crystal molecules LC and equipotential lines EQ of an electric field generated in a liquid crystal layer, observed 200 msec after application of a white voltage across the liquid crystal layer, in the cases that no cut is formed (FIG. 12A), the width W of a cut is 3 μm (FIG. 12B), 6 μm (FIG. 12C), 9 μm (FIG. 12D), 12 μm (FIG. 12E) and 15 μm (FIG. 12F).
Figure 12B:
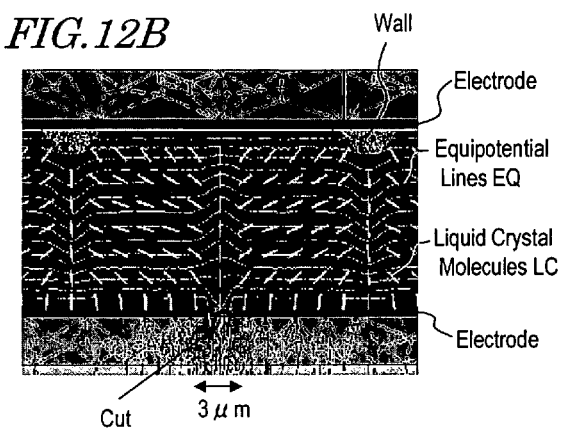
Figure 12C:
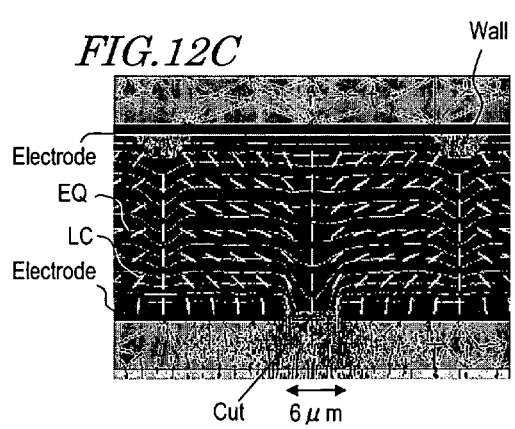
Figure 12D:
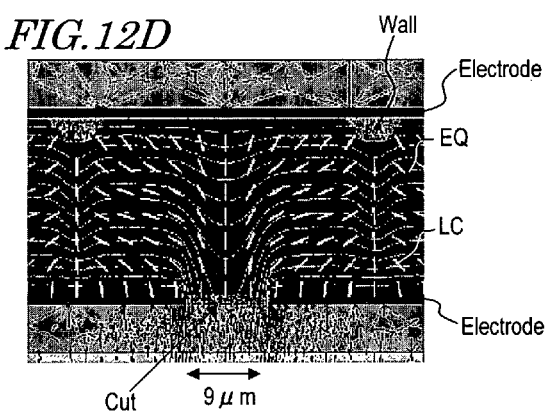
Figure 12E:
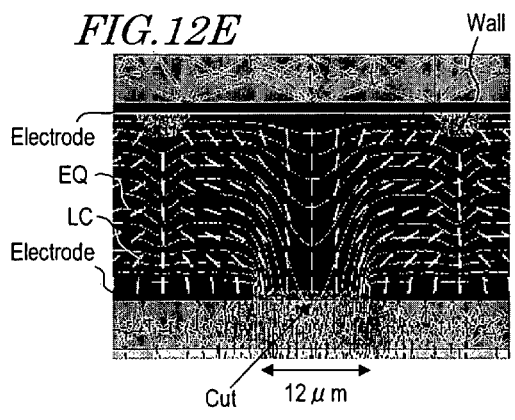
Figure 12F:
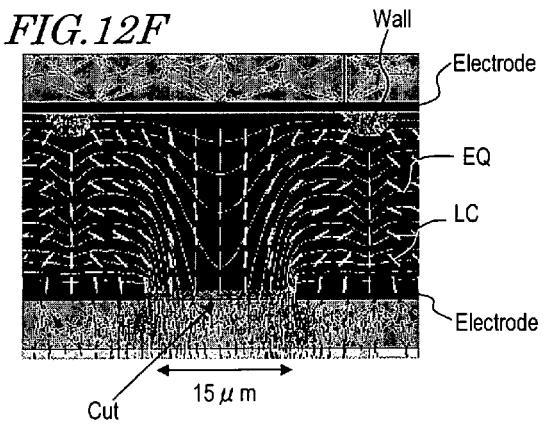

FIGS. 12A to 12F respectively show the cases that no cut is formed (FIG. 12A), the width W of a cut is 3 μm (FIG. 12B), 6 μm (FIG. 12C), 9 μm (FIG. 12D), 12 μm (FIG. 12E) and 15 μm (FIG. 12F). As is found from FIGS. 12A through 12F, as the width W of the cut increases, the equipotential lines EQ are more drawn into the cut, and with this, liquid crystal molecules in the cut are aligned closer to the vertical.

Why the width W of the cut of 7 μm was obtained from the results in Table 1 will be described.

Figure 13:
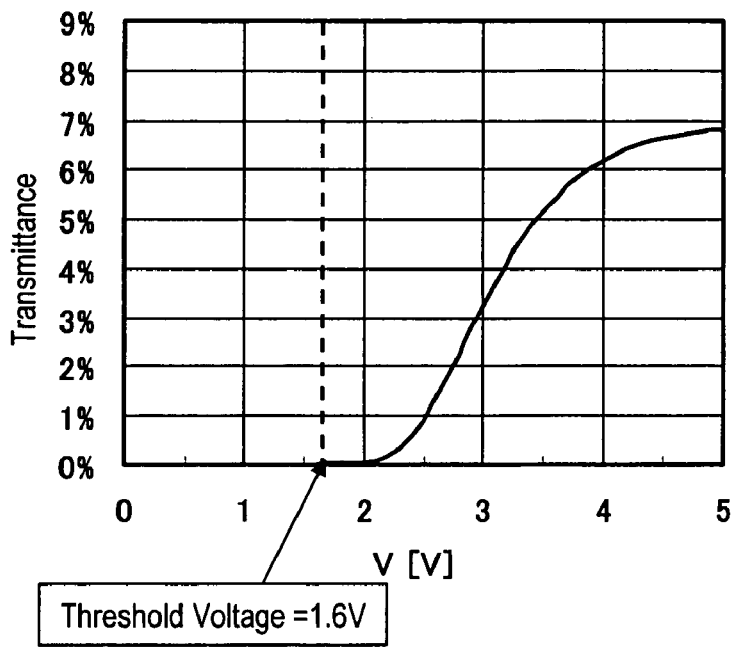
FIG. 13 is a graph showing the voltage-transmittance characteristics of a liquid crystal display device.

The LCD device used for the experiment of which the results are shown in Table 1 has the voltage-transmittance characteristics (V-T curve) shown in FIG. 13 in which the threshold voltage of the liquid crystal layer is 1.6 V. The threshold voltage as used herein is defined as a voltage which gives 3% transmittance of the transmittance at a saturation voltage.

Figure 14:
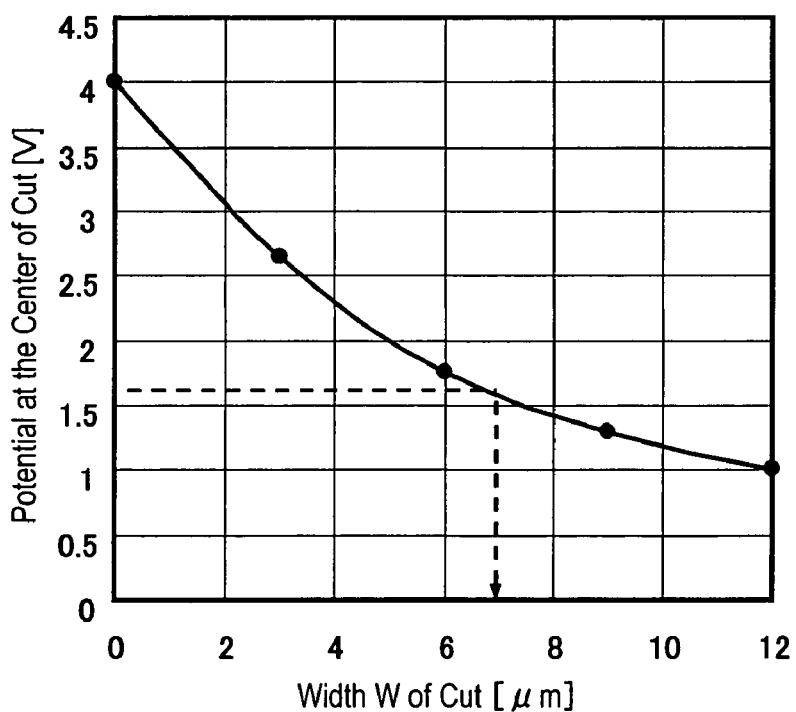
FIG. 14 is a graph showing the results of calculation of the relationship between the width W of a cut and the potential at the center (position of W/2) of the cut.

FIG. 14 is a graph showing the results of calculation of the relationship between the width W of a cut and the potential at the center (position of W/2) of the cut. As is found from FIG. 14, as the width W of the cut increases, the potential at the center of the cut decreases. It is when the width W is about 7 μm that the potential is 1.6 V, the threshold voltage.

In other words, when the width W of the cut is greater than the width W with which the potential at the center of the cut is roughly equal to the threshold voltage, the axisymmetrically aligned domains can be formed stably by forming the transparent dielectric layer 334 so that the end face (EL) thereof coincides with the center (CL) of the width W of the cut 313a (dL=0) or is located on the side of the reflective electrode 311b with respect to the center (CL).

As described above, the width W of the cut is preferably 7 μm or more, but to suppress reduction in aperture ratio, a smaller width W of the cut is more preferable. It is therefore preferred to set the minimum center value so that the width W of the cuts of 7 μm or more is secured even in consideration of the process margin.

The reason why the axisymmetrically aligned domains are formed stably with the above construction will be described with reference to FIGS. 15A and 15B.

Figure 15A:
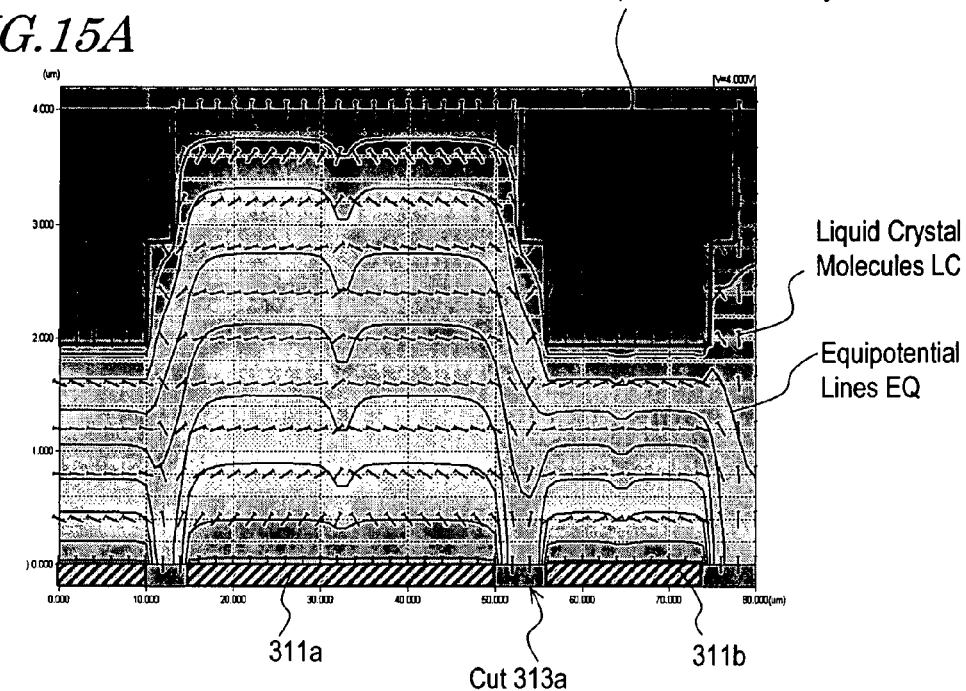
FIG. 15A is a view diagrammatically showing equipotential lines EQ of an electric field generated in a liquid crystal layer near a cut 313a and the alignment of liquid crystal molecules LC in the liquid crystal display device of the embodiment.
Figure 15B:
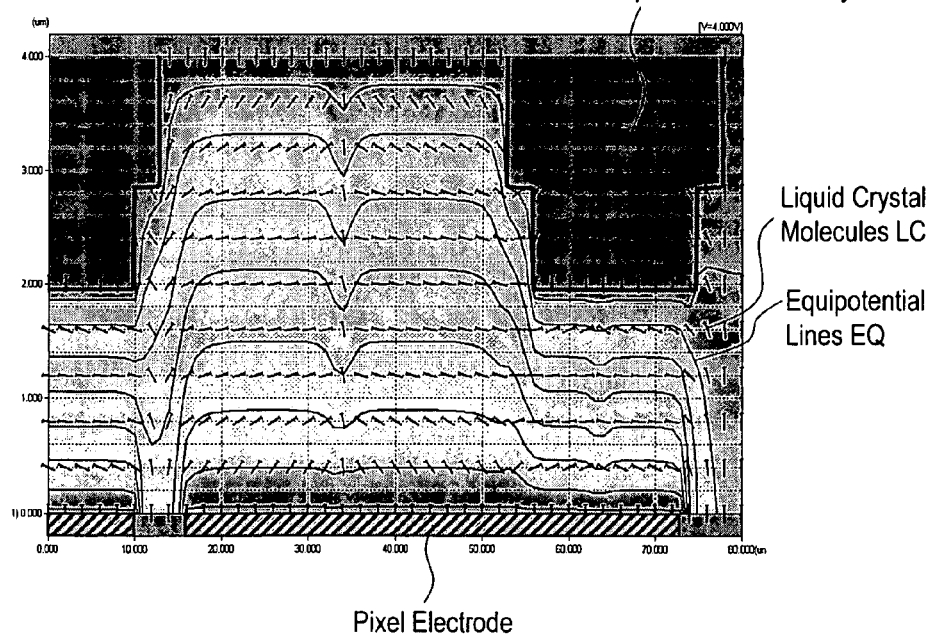
FIG. 15B is a view diagrammatically showing equipotential lines EQ of an electric field generated in a liquid crystal layer and the alignment of liquid crystal molecules LC in the case of providing no cuts.

FIG. 15A is a view diagrammatically showing equipotential lines EQ of an electric field generated near the cut 313a in the liquid crystal layer and the alignment of liquid crystal molecules LC in a liquid crystal display device of an embodiment of the present invention, and FIG. 15B is a view diagrammatically showing equipotential lines EQ of an electric field generated in a liquid crystal layer and the alignment of liquid crystal molecules LC in the case of providing no cuts. The counter electrode (not shown) is formed covering the transparent dielectric layer. These are the results of alignment simulation obtained when a white voltage (4 V in the illustrated example) was applied between the electrodes.

As shown in FIG. 15A, when the end face of the transparent dielectric layer 334 coincides with the end of reflective electrode 311b (the end facing the transparent electrode 311a) (that is, dL=W/2), the alignment direction of liquid crystal molecules near the side face of the transparent dielectric layer 334 facing the transmission region matches with the alignment direction of liquid crystal molecules caused by the inclined electric field generated with the cut 313a. As a result, the axisymmetric alignment is given stably in the reflection region and the transmission region.

On the contrary, as is found from FIG. 15B, when no cut is formed, the alignment direction of liquid crystal molecules near the side face of the transparent dielectric layer conflicts with the alignment direction of liquid crystal molecules near the pixel electrode. As a result, no stable formation of axisymmetric alignment is attained.

To keep the alignment of liquid crystal molecules with the inclined electric field (alignment regulating force) generated with the cut 313a from being disturbed with the step of the transparent dielectric layer 334, the end face (EL) of the transparent dielectric layer 334 should preferably coincide with the center (CL) of the width W of the cut 113a (dL=0) or be located on the side of the reflective electrode 311b with respect to the center (CL), as described above with reference to Table 1. Also, the width of the cut 313a is preferably set so that the potential at the center of the cut 313a is equal to or less than the threshold voltage of the liquid crystal layer when a white voltage is applied. This relationship is substantially established when 0.3 dt<dr<0.7 dt is satisfied.

As described above, according to the present invention, an LCD device with excellent display quality can be implemented with a comparatively simple construction. The present invention is suitably applied to transmissive LCD devices and transflective (transmissive/reflective) LCD devices. In particular, transflective LCD devices are suitably used as display devices for mobile equipment such as mobile phones.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This non-provisional application claims priority under 35 USC §119(a) on Patent Applications No. 2004-043537 filed in Japan on Feb. 19, 2004 and 2005-028649 filed in Japan on Feb. 4, 2005, the entire contents of which are hereby incorporated by reference.

What is claimed is:

1. A liquid crystal display device comprising a first substrate, a second substrate opposed to the first substrate, and a vertically aligned liquid crystal layer interposed between the first substrate and the second substrate,
   wherein the liquid crystal display device has a plurality of pixels, each pixel including a first electrode formed on the first substrate, a second electrode formed on the second substrate, and the liquid crystal layer interposed between the first electrode and the second electrode,
   the first electrode has at least one opening or cut formed at a predetermined position in the pixel,
   at least one shading conductive layer electrically connected to the first electrode is formed at least near the at least one opening or cut,
   in each of the plurality of pixels, a plurality of regions in which directions of tilt of liquid crystal molecules are different from one another are formed when at least a predetermined voltage is applied across the liquid crystal layer, and
   wherein at least one shading conductive layer is surrounded on all lateral sides by the first electrode and is not located between adjacent pixels.

2. The device of claim 1, wherein, in each of the plurality of pixels, at least one liquid crystal domain exhibiting axisymmetric alignment is formed when at least a predetermined voltage is applied across the liquid crystal layer.

3. The device of claim 1, wherein the at least one shading conductive layer includes a shading conductive layer covering at least part of the at least one opening or cut.

4. The device of claim 1, wherein the at least one opening or cut includes two cuts opposed each other, and the at least one shading conductive layer includes a first shading conductive layer covering the two opposing sides of the two cuts.

5. The device of claim 1, wherein the at least one opening or cut includes at least two openings, and the at least one shading conductive layer includes at least two shading conductive layers covering the at least two openings.

6. The device of claim 5, wherein the liquid crystal layer has at least two liquid crystal domains each exhibiting axisymmetric alignment when at least a predetermined voltage is applied, and the center axes of the axisymmetric alignment of the at least two liquid crystal domains are formed in or near the at least two openings.

7. The device of claim 1, wherein the shading conductive layer is formed of a metal film.

8. The device of claim 7, wherein the metal film includes at least one kind of metal element selected from the group consisting of Al, Ag, Ti, Ta, Mo and W.

9. The device of claim 1, further comprising a shading region in the gaps between the plurality of pixels, and a wall structure regularly arranged on the surface of the first substrate facing the liquid crystal layer in the shading region.

10. The device of claim 1, wherein the first electrode includes a transparent electrode defining a transmission region and a reflective electrode defining a reflection region, at least one liquid crystal domain includes a liquid crystal domain formed in the transmission region, the at least one opening or cut includes an opening corresponding to a center axis of the liquid crystal domain formed in the transmission region and a plurality of cuts formed point-symmetrically with respect to the opening.

11. The device of claim 1, further comprising: a pair of polarizing plates placed to face each other via the first substrate and the second substrate; and at least one biaxial optical anisotropic medium layer placed between the first substrate and one of the pair of polarizing plates and/or between the second substrate and the other polarizing plate.

12. The device of claim 1, further comprising: a pair of polarizing plates placed to face each other via the first substrate and the second substrate; and at least one uniaxial optical anisotropic medium layer placed between the first substrate and one of the pair of polarizing plates and/or between the second substrate and the other polarizing plate.

13. A liquid crystal display device comprising a first substrate, a second substrate opposed to the first substrate, and a vertically aligned liquid crystal layer interposed between the first substrate and the second substrate,
   wherein the liquid crystal display device has a plurality of pixels, each pixel including a first electrode formed on the first substrate, a second electrode formed on the second substrate, and the liquid crystal layer interposed between the first electrode and the second electrode,
   the first electrode has at least one opening or cut formed at a predetermined position in the pixel,
   at least one shading conductive layer electrically connected to the first electrode is formed at least near the at least one opening or cut,
   in each of the plurality of pixels, a plurality of regions in which directions of tilt of liquid crystal molecules are different from one another are formed when at least a predetermined voltage is applied across the liquid crystal layer;
   wherein the second electrode has at least one further opening formed at a predetermined position in the pixel, and
   a center axis of axisymmetric alignment of at least one liquid crystal domain formed when at least a predetermined voltage is applied across the liquid crystal layer is formed in or near the at least one further opening.

14. The device of claim 13, wherein at least one further shading conductive layer electrically connected to the second electrode is formed to cover the at least one further opening.

15. The device of claim 14, wherein the first electrode includes a transparent electrode defining a transmission region and a reflective electrode defining a reflection region, and a thickness dt of the liquid crystal layer in the transmission region and a thickness dr of the liquid crystal layer in the reflection region satisfy a relationship 0.3 dt <dr<0.7 dt.

16. The device of claim 15, wherein the reflective electrode and the at least one shading conductive layer are formed from a same metal film.

17. The device of claim 15, wherein a transparent dielectric layer is formed selectively on the second substrate in the reflection region.

18. A liquid crystal display device according to claim 17, comprising a first substrate, a second substrate opposed to the first substrate, and a vertically aligned liquid crystal layer interposed between the first substrate and the second substrate, wherein the liquid crystal display device has a plurality of pixels, each pixel including a first electrode formed on the first substrate, a second electrode formed on the second substrate, and the liquid crystal layer interposed between the first electrode and the second electrode, the first electrode has a transparent electrode defining a transmission region, a reflective electrode defining a reflection region, and a cut formed between the transparent electrode and the reflective electrode, the second substrate further has a transparent dielectric layer in the reflection region, the thickness dt of the liquid crystal layer in the transmission region and the thickness dr of the liquid crystal layer in the reflection region satisfy the relationship $0.3\ dt < dr < 0.7\ dt$, the transparent dielectric layer has an end face coinciding the center of the width of the cut or located on the side of the reflective electrode with respect to the center, and the liquid crystal layer has at least one liquid crystal domain exhibiting axisymmetric alignment in each of the transmission region and the reflection region when at least a predetermined voltage is applied.

19. The device of claim 18, wherein the potential at the center of the cut is lower than a threshold voltage of the liquid crystal layer when a white voltage is applied across the liquid crystal layer.

* * * * *